US011822305B2

(12) United States Patent
Goli et al.

(10) Patent No.: US 11,822,305 B2
(45) Date of Patent: *Nov. 21, 2023

(54) GRAPHICAL INTERFACE FOR CONFIGURATION OF INDUSTRIAL AUTOMATION SYSTEMS

(71) Applicant: INTELLIGENT PLATFORMS, LLC, Charlottesville, VA (US)

(72) Inventors: Balajose Goli, Hyderabad (IN); Abitha Beevi Mohammed Siddique, Hyderabad (IN); Venkatesh Mani Selvaraj, Hyderabad (IN); Vishal Fogla, Hyderabad (IN); Shantanu Ratnakar Rao Choudhary, Hyderabad (IN)

(73) Assignee: INTELLIGENT PLATFORMS, LLC, Charlottesville, VA (US)

( * ) Notice: Subject to any disclaimer, the term of this patent is extended or adjusted under 35 U.S.C. 154(b) by 410 days.

This patent is subject to a terminal disclaimer.

(21) Appl. No.: 17/140,750

(22) Filed: Jan. 4, 2021

(65) Prior Publication Data
US 2021/0124329 A1 Apr. 29, 2021

Related U.S. Application Data

(62) Division of application No. 15/040,034, filed on Feb. 10, 2016, now abandoned.

(51) Int. Cl.
*G05B 19/05* (2006.01)
*G05B 19/042* (2006.01)
(Continued)

(52) U.S. Cl.
CPC ......... *G05B 19/05* (2013.01); *G05B 19/0426* (2013.01); *G06F 3/0482* (2013.01);
(Continued)

(58) Field of Classification Search
CPC ....................................................... G05B 19/05
(Continued)

(56) References Cited

U.S. PATENT DOCUMENTS 5,168,441 A * 12/1992 Onarheim .......... G05B 19/0426
700/87
5,408,659 A * 4/1995 Cavendish ............ G06F 16/289
717/109
(Continued)

FOREIGN PATENT DOCUMENTS

CN        104750063 A      7/2015

OTHER PUBLICATIONS

Office Action for Chinese Application No. 201710073802.9, dated Nov. 27, 2020.

*Primary Examiner* — Md Azad
(74) *Attorney, Agent, or Firm* — MARSHALL, GERSTEIN & BORUN LLP

(57) ABSTRACT

Exemplified herein is a graphical user interface for an industrial automation system that provides, in a single aggregated and eloquent view, a configuration workspace to discover and present configuration details of control components within an industrial automation system. These components may include industrial controllers, programmable logic controllers (PLCs), supervisory control and data acquisition (SCADA) systems, programmable automation controllers (PACs), and the like, which have modules (as well as submodules) connected thereto. Among other things, the configuration workspace enables a holistic view of identified hardware configuration and the modular reconciliation and troubleshoot of the network device and module configurations.

20 Claims, 12 Drawing Sheets

(51) Int. Cl.
*G06F 3/0482* (2013.01)
*G06F 3/04847* (2022.01)

(52) U.S. Cl.
CPC .............. *G06F 3/04847* (2013.01); *G05B 2219/13144* (2013.01); *G05B 2219/15006* (2013.01); *G05B 2219/25067* (2013.01)

(58) Field of Classification Search
USPC .......................................................... 700/83
See application file for complete search history.

(56) References Cited

U.S. PATENT DOCUMENTS

| | | |
|---|---|---|
| 6,618,630 B1 | 9/2003 | Jundt et al. |
| 7,051,317 B2* | 5/2006 | Vazquez ............ G05B 19/0426 717/123 |
| 7,730,428 B1 | 6/2010 | Yehuda et al. |
| 2003/0028269 A1 | 2/2003 | Spriggs et al. |
| 2006/0168183 A1* | 7/2006 | Fuller, III ............... H04L 67/12 717/120 |
| 2007/0239351 A1 | 10/2007 | Sherrill et al. |
| 2011/0055787 A1* | 3/2011 | Stowers .................. G06F 30/00 716/126 |
| 2014/0282141 A1 | 9/2014 | Sayed et al. |
| 2015/0186118 A1 | 7/2015 | Prosak et al. |

\* cited by examiner

326

| Attribute | Configuration | Hardware |
|---|---|---|
| Category Name | PAC8000 Modules | PAC8000 Modules |
| ID | IDM_8201_HI_IS | IDM_8228_AI_UN |
| Module Name | 8132-HI-IS | 8132-AI-UN |
| Slot Number | 8 | 8 |
| Sub category Name | Analog Input Module | Analog Input Module |
| Submodules | 1 | 2 |

| | Attribute | Value |
|---|---|---|
| 8132-AI-UN | Category Name | PAC8000 Modules |
| DC CI | Description | Analog input 8-Ch, 4-20mA Thermocouple input 2/2 |
| RTD IP | ID | IDM_8132_AI_UN |
| | Module Name | 8132-AI-UN |
| | Slot Number | |
| | Sub category name | Analog Input Module |
| | Submodules | 2 |

FIG. 5

GRAPHICAL INTERFACE FOR CONFIGURATION OF INDUSTRIAL AUTOMATION SYSTEMS

FIELD OF THE DISCLOSURE

Embodiments of the disclosure generally relate to controls of industrial automation systems, and more particularly graphical interface for configuring industrial automation systems.

BACKGROUND

Industrial automation systems can include tens to hundreds of controllers to monitor and control sets of subsystems. Examples of such applications include a power plant, a factory, a refinery, a power distribution site, a wind or solar farm, building systems, among others. As industrial communication networks grow in complexity, the configuration of devices in such industrial networks becomes a resource-intensive endeavor. For example, each individual controller, such as programmable logic controllers and supervisory control and data acquisition (SCADA) systems, may have tens to hundreds of input-output modules and sub-modules. The individual input-output module and submodule may include numerous digital and analog input and/or output channels to monitor or sense a variety of different types of input signals such as thermocouple inputs, resistance temperature detectors (RTDs), currents, voltages, capacitances, inductances, and resistances, and provide corresponding outputs.

Though protocols such as Profin™, and the like, provide description files and data associated with a given hardware to be more easily shared among connected devices within the industrial network, the configuration information are nevertheless aggregated in complex views, e.g., in data grids.

What are needed are devices, systems and methods that overcome challenges in the present art, some of which are described above.

SUMMARY

Exemplified herein is a graphical user interface for an industrial automation system that provides, in a single aggregated and eloquent view, a configuration workspace to discover and present configuration details of control components within an industrial automation system. These components may include industrial controllers, programmable logic controllers (PLCs), supervisory control and data acquisition (SCADA) systems, programmable automation controllers (PACs), and the like, which have modules (as well as submodules) connected thereto. The configuration workspace enables a holistic view of identified hardware configuration and the modular reconciliation and troubleshoot of the network device and module configurations.

In some embodiments, the configuration workspace allows the user to quickly view the device and device module/submodules details (such as slot location, device and module description, category, among others) of each input-output hardware device and the respective I/O module and submodules of that device.

In some embodiments, the configuration workspace further allows the user to selectively retrieve configuration and device data of certain input-output hardware devices selected from a list of available connected device, to readily review differences between the retrieved device data and the configuration data within the development workspace, and then to allow the user to selectively convert and/or import the retrieved device data to software configuration profile for the input-output hardware device and the input-output modules (and submodules thereof). In some embodiments, the configuration workspace further presents both comparative representation of the device configuration and the software configuration as well as dialog-boxes with comparative details for each respective input-output hardware device and modules.

In some embodiments, the graphical user interface further provides an interactive display within the configuration workspace that allows user to intuitively and quickly modify network parameters (e.g., name and network address, e.g., IP address) of each input-output hardware device within the network.

In an aspect, a method for configuring hardware devices in an industrial automation system is disclosed. The method includes presenting, by a processor, via a display, on a first pane of a development workspace, a plurality of graphical elements comprising a list (e.g., a tree of distributed IO devices) of one or more controller hardware devices, wherein each of the one or more controller hardware devices is coupled to a plurality of input-output hardware devices, each having a plurality of input-output modules, (e.g., wherein the hardware devices, input-output hardware devices, and input-output modules, collectively, form the industrial automation system); upon selection, in the first pane, of a graphical element associated with a given controller hardware device from the plurality of presented graphical elements, determining, by the processor, a plurality of associated input-output hardware devices connected to the controller device; and generating, by the processor, via the display, on a second pane of the development workspace, a visual representation of the selected controller device and the determined plurality of associated input-output hardware devices, wherein the visual representation comprises a first graphical element of the selected controller device and a second graphical element of each of the determined plurality of associated input-output hardware devices, wherein each of the second graphical element comprises a third graphical element for each input-output module associated with the input-output hardware device.

In some embodiments, the method further includes presenting, by the processor, via the display, on the second pane of a development workspace, one or more selectable widgets, each configured to allow selection of an input-output hardware device presented as the second graphical elements (e.g., wherein each selectable widget is presented proximal to the respective second graphical elements) for update of the hardware configuration data associated therewith; receiving, by the processor, a selection of a prompt to auto-discover and update the hardware configuration of one or more input-output hardware devices associated with selectable widgets selected via the display (e.g., wherein the prompt is located in the second pane); and in response to the selection of the prompt, retrieving hardware configuration of the input-output hardware devices associated with the selected selectable widgets and updating the presented first, second, and third graphical elements with the retrieved hardware configuration.

In some embodiments, the retrieved hardware configuration of the input-output hardware devices includes module data (e.g., module name, identification number, order number, etc.), input-output channel configuration data, and input-output parameter data.

In some embodiments, the method includes, in response to the selection of the prompt, presenting, via the display, on the first pane, within the list of one or more controller hardware devices, fourth graphical elements corresponding to input-output modules operatively coupled to each respective input-output hardware device.

In some embodiments, the development workspace includes a second widget to enable a workspace for converting, on-the-fly, software configuration of the development workspace from auto-discovered device configuration, the method further includes receiving, by the processor, input from a graphical user interface (GUI); in response to the GUI input coinciding with activation of the second widget, generating, by the processor, via the display, on the second pane of the development workspace, a visual representation of a comparison between the hardware configuration and the software configuration of the given input-output hardware device, wherein the visual representation of the comparison comprises i) a plurality of fifth graphical elements associated with a first matched or mismatched configuration state of the software configuration for the given input-output hardware device and ii) a plurality of sixth graphical elements associated with a second matched or mismatched configuration state of the hardware configuration for the given input-output hardware device.

In some embodiments, each of the plurality of fifth graphical elements and the plurality of sixth graphical elements includes an empty configuration state for each input-output module location in the given input-output hardware device not having a connected input-output module.

In some embodiments, the method further includes, for each of the plurality of fifth graphical elements and the plurality of sixth graphical element, comparing configuration data associated with a given fifth graphical element with configuration data associated with a given sixth graphical element; for each mismatched state between the compared configuration data, generating, by the processor, via the display, on the second pane of the development workspace, one or more seventh graphical elements at a location between respective mismatched fifth graphical element and mismatched sixth graphical element, wherein each of the one or more seventh graphical elements includes either a matched symbol (e.g., equal sign) or a mismatched symbol (e.g., unequal sign).

In some embodiments, the method further includes, for each mismatched state between the compared configuration data, generating, by the processor, via the display, on the second pane of the development workspace, one or more eighth graphical elements (e.g., a checkbox) at a location proximal to the sixth graphical elements, each of the one or more eighth graphical elements comprising a widget (e.g., a checkbox) for a selection of the configuration data associated with the hardware configuration to replace configuration data associated with the corresponding software configuration.

In some embodiments, the method includes, in response to a selection of a widget associated with a given eighth graphical element of the one or more eighth graphical elements, updating, by the processor, the configuration data of the software configuration with the retrieved hardware configuration.

In some embodiments, the method includes, in response to the GUI input coinciding with a given generated seventh graphical element, retrieving, by the processor, configuration data (e.g., category name, identification, module name, slot number, sub category name, and submodule number for the in-software configuration) for the software configuration and configuration data for the hardware configuration for the given input-output hardware device; and generating, by the processor, a ninth graphical element as a dynamic overlay of the first and second configuration data, the overlay being disposed at the determined pointer location proximal to the given generated seventh graphical element.

In some embodiments, the one or more seventh graphical elements include a first set of symbols associated with a mismatched state between the hardware configuration and the software configuration for each input-output module of the input-output hardware device.

In some embodiments, the one or more seventh graphical elements include a second set of symbols associated with a matched state between the hardware configuration and the software configuration for the input-output hardware device.

In some embodiments, each of the one or more seventh graphical elements comprises a first color value and a second color value, wherein the first color value is presented when all parameters of the hardware configuration and software configuration for a given input-output module of the input-output hardware device have a matched state, and wherein the second color value is presented when any parameters of the hardware configuration and software configuration for the given input-output module of the input-output hardware device has a mismatched state.

In some embodiments, the method includes, upon the selection, in the first pane, of a graphical element associated with the given controller hardware device, the method further comprising: determining, by the processor, an identifier and one or more network parameters associated with the input-output hardware devices associated with the selected controller hardware device; generating, by the processor, on the second pane of the development workspace, a widget having a presentation of the determined identifier and the determined one or more network parameters, wherein the widget is rendered proximal to the respective second graphical element associated with the determined input-output hardware device; receiving, by the processor, via the presented widget, one or more modified values for the one or more network parameters; and for each modified values received via the presented widget, causing, by the processor, the modified values of the one or more network parameters to be updated to the determined input-output hardware device.

In some embodiments, the one or more network parameters for the determined input-output hardware device are updated automatically and without further user input.

In some embodiments, the method includes receiving, by the processor, input from a graphical user interface; determining, by the processor, a location of a pointer based on the GUI input and generating a visual representation of the pointer on the display; in response to the location of the pointer coinciding with the visual representation of a third graphical element of an input-output module presented in the second pane, retrieving, by the processor, configuration information of the respective input-output module; and generating, by the processor, an eleventh graphical element as a dynamic overlay, the overlay being disposed at the determined pointer location over the third graphical element.

In some embodiments, the method includes, for each submodule coupled to the input-output module, presenting, via the eleventh graphical element, a selectable pane to display configuration data associated with a given submodule.

In some embodiments, the configuration information includes a first data having a slot value associated with a slot location of the input-output submodule within the input-output hardware devices, a second data having a description value associated with the input-output hardware device, and a third data having a category value associated with the input-output hardware device.

In another aspect, a system for configuring hardware devices in an industrial automation system is disclosed. The system includes a processor; and a memory coupled to the processor, the memory having instructions stored thereon, wherein the instructions, when executed by the processor, cause the processor to: present, via a display, on a first pane of a development workspace, a plurality of graphical elements comprising a list of one or more controller hardware devices, wherein each of the one or more controller hardware devices is coupled to a plurality of input-output hardware devices, each having a plurality of input-output submodules; upon selection, in the first pane, of a graphical element associated with a given controller hardware device from the plurality of presented graphical elements, determine a plurality of associated input-output hardware devices connected to the controller device; and generate, via the display, on a second pane of the development workspace, a visual representation of the selected controller device and the determined plurality of associated input-output hardware devices, wherein the visual representation comprises a first graphical element of the selected controller device and a second graphical element of each of the determined plurality of associated input-output hardware devices, wherein each of the second graphical element comprises a third graphical element for each input-output submodule associated with the input-output hardware device.

In some embodiments, the instructions, when executed by the processor, cause the processor to present, via the display, on the second pane of a development workspace, one or more selectable widgets, each configured to allow selection of an input-output hardware device presented as the second graphical elements (e.g., wherein each selectable widget is presented proximal to the respective second graphical elements) for update of the hardware configuration data associated therewith; receive a selection of a prompt to auto-discover and update the hardware configuration of one or more input-output hardware devices associated with selectable widgets selected via the display (e.g., wherein the prompt is located in the second pane); and in response to the selection of the prompt, retrieve hardware configuration of the input-output hardware devices associated with the selected selectable widgets and update the presented first, second, and third graphical elements with the retrieved hardware configuration.

In some embodiments, the retrieved hardware configuration of the input-output hardware devices includes module data (e.g., module name, identification number, order number, etc.); input-output channel configuration data; and input-output parameter data.

In some embodiments, in response to the selection of the prompt, the instructions, when executed by the processor, cause the processor to present, via the display, on the first pane, within the list of one or more controller hardware devices, fourth graphical elements corresponding to input-output modules operatively coupled to each respective input-output hardware devices.

In some embodiments, the development workspace includes a second widget to enable a workspace for converting, on-the-fly, software configuration of the development workspace from auto-discovered device configuration. The instructions, when executed by the processor, cause the processor to receive input from a graphical user interface; in response to the input coinciding with activation of the second widget, generate, via the display, on the second pane of the development workspace, a visual representation of a comparison between the hardware configuration and the software configuration of the given input-output hardware device, wherein the visual representation of the comparison comprises i) a plurality of fifth graphical elements associated with a first matched or mismatched configuration state of the software configuration for the given input-output hardware device and ii) a plurality of sixth graphical elements associated with a second matched or mismatched configuration state of the hardware configuration for the given input-output hardware device.

In some embodiments, each of the plurality of fifth graphical elements and the plurality of sixth graphical elements includes an empty configuration state for each input-output module location in the given input-output hardware device not having a connected input-output module.

In some embodiments, the instructions, when executed by the processor, cause the processor to, for each of the plurality of fifth graphical elements and the plurality of sixth graphical element, compare configuration data associated with a given fifth graphical element with configuration data associated with a given sixth graphical element; for each mismatched state between the compared configuration data, generate, via the display, on the second pane of the development workspace, one or more seventh graphical elements at a location between respective mismatched fifth graphical element and mismatched sixth graphical element, wherein each of the one or more seventh graphical elements includes either a matched symbol (e.g., equal sign) or a mismatched symbol (e.g., unequal sign).

In some embodiments, the instructions, when executed by the processor, cause the processor to, for each mismatched state between the compared configuration data, generate, via the display, on the second pane of the development workspace, one or more eighth graphical elements (e.g., a checkbox) at a location proximal to the sixth graphical elements, each of the one or more eighth graphical elements comprising a widget (e.g., a checkbox) for a selection of the configuration data associated with the hardware configuration to replace configuration data associated with the corresponding software configuration.

In some embodiments, the instructions, when executed by the processor, cause the processor to, in response to a selection of a widget associated with a given eighth graphical element of the one or more eighth graphical elements, update the configuration data of the software configuration with the retrieved hardware configuration.

In some embodiments, the instructions, when executed by the processor, cause the processor to, in response to the input coinciding with a given generated seventh graphical element, retrieve configuration data (e.g., category name, identification, module name, slot number, sub category name, and submodule number for the in-software configuration) for the software configuration and the configuration data for the hardware configuration for the given input-output hardware device; and generate a ninth graphical element as a dynamic overlay of the first and second configuration data, the overlay being disposed at the determined pointer location over the given generated seventh graphical element.

In some embodiments, the one or more seventh graphical elements include a first set of symbols associated with a mismatched state between the hardware configuration and the software configuration for each input-output module of the input-output hardware device.

In some embodiments, the one or more seventh graphical elements include a second set of symbols associated with a matched state between the hardware configuration and the software configuration for the input-output hardware device.

In some embodiments, each of the one or more seventh graphical elements comprises a first color value and a second color value, wherein the first color value is presented when all parameters of the hardware configuration and software configuration for a given input-output module of the input-output hardware device have a matched state, and wherein the second color value is presented when any parameters of the hardware configuration and software configuration for the given input-output module of the input-output hardware device has a mismatched state.

In some embodiments, the instructions, when executed by the processor, cause the processor to, upon the selection, in the first pane, of a graphical element associated with the given controller hardware device, determine an identifier and one or more network parameters associated with the input-output hardware devices associated with the selected controller hardware device; generate on the second pane of the development workspace, a widget having a presentation of the determined identifier and the determined one or more network parameters, wherein the widget is rendered proximal to the respective second graphical element associated with the determined input-output hardware device; receive via the presented widget, one or more modified values for the one or more network parameters; and for each modified values received via the presented widget, cause the modified values of the one or more network parameters to be updated to the determined input-output hardware device.

In some embodiments, the one or more network parameters for the determined input-output hardware device are updated automatically and without further user input.

In some embodiments, the instructions, when executed by the processor, cause the processor to receive input from a graphical user interface; determine a location of a pointer based on the GUI and generating a visual representation of the pointer on the display; in response to the location of the pointer coinciding with the visual representation of a third graphical element of an input-output module presented in the second pane, retrieve configuration information of the respective input-output module; and generate an eleventh graphical element as a dynamic overlay, the overlay being disposed at the determined pointer location over the third graphical element.

In some embodiments, the instructions, when executed by the processor, cause the processor to, for each submodule coupled to the input-output module, present, via the eleventh graphical element, a selectable pane to display configuration data associated with a given submodule.

In some embodiments, the configuration information includes a first data having a slot value associated with a slot location of the input-output submodule within the input-output hardware devices, a second data having a description value associated with the input-output hardware device, and a third data having a category value associated with the input-output hardware device.

In another aspect, a non-transitory computer readable medium for configuring hardware devices in an industrial automation system is disclosed. The non-transitory computer readable medium includes instructions having stored thereon, wherein the instructions, when executed by a processor, cause the processor to present, via a display of a computing device, on a first pane of a development workspace, a plurality of graphical elements comprising a list (e.g., a tree of distributed IO devices) of one or more controller hardware devices, wherein each of the one or more controller hardware devices is coupled to a plurality of input-output hardware devices, each having a plurality of input-output submodules, (e.g., wherein the hardware devices, input-output hardware devices, and input-output submodules, collectively, form the industrial automation system); upon selection, in the first pane, of a graphical element associated with a given controller hardware device from the plurality of presented graphical elements, determine a plurality of associated input-output hardware devices connected to the controller device; and generate, via the display, on a second pane of the development workspace, a visual representation of the selected controller device and the determined plurality of associated input-output hardware devices, wherein the visual representation comprises a first graphical element of the selected controller device and a second graphical element of each of the determined plurality of associated input-output hardware devices, wherein each of the second graphical element comprises a third graphical element for each input-output submodule associated with the input-output hardware device.

In some embodiments, the instructions, when executed by the processor, cause the processor to present, via the display, on the second pane of a development workspace, one or more selectable widgets, each configured to allow selection of an input-output hardware device presented as the second graphical elements (e.g., wherein each selectable widget is presented proximal to the respective second graphical elements) for update of the hardware configuration data associated therewith; receive a selection of a prompt to auto-discover and update the hardware configuration of one or more input-output hardware devices associated with selectable widgets selected via the display (e.g., wherein the prompt is located in the second pane); and in response to the selection of the prompt, retrieve hardware configuration of the input-output hardware devices associated with the selected selectable widgets and update the presented first, second, and third graphical elements with the retrieved hardware configuration.

In some embodiments, the retrieved hardware configuration of the input-output hardware devices includes module data (e.g., module name, identification number, order number, etc.), input-output channel configuration data, and input-output parameter data.

In some embodiments, the instructions, when executed by the processor, cause the processor to, in response to the selection of the prompt, present, via the display, on the first pane, within the list of one or more controller hardware devices, fourth graphical elements corresponding to input-output modules operatively coupled to each respective input-output hardware devices.

In some embodiments, the development workspace includes a second widget to enable a workspace for converting, on-the-fly, software configuration of the development workspace from auto-discovered device configuration. The instructions, when executed by the processor, cause the processor to receive input from a graphical user interface; in response to the GUI input coinciding with activation of the second widget, generate, via the display, on the second pane of the development workspace, a visual representation of a comparison between the hardware configuration and the software configuration of the given input-output hardware device, wherein the visual representation of the comparison comprises i) a plurality of fifth graphical elements associated with a first matched or mismatched configuration state of the software configuration for the given input-output hardware device and ii) a plurality of sixth graphical elements associated with a second matched or mismatched configuration state of the hardware configuration for the given input-output hardware device.

In some embodiments, each of the plurality of fifth graphical elements and the plurality of sixth graphical elements includes an empty configuration state for each input-output module location in the given input-output hardware device not having a connected input-output module.

In some embodiments, the instructions, when executed by the processor, cause the processor to, for each of the plurality of fifth graphical elements and the plurality of sixth graphical element, compare configuration data associated with a given fifth graphical element with configuration data associated with a given sixth graphical element; for each mismatched state between the compared configuration data, generate, via the display, on the second pane of the development workspace, one or more seventh graphical elements at a location between respective mismatched fifth graphical element and mismatched sixth graphical element, wherein each of the one or more seventh graphical elements includes either a matched symbol (e.g., equal sign) or a mismatched symbol (e.g., unequal sign).

In some embodiments, the instructions, when executed by the processor, cause the processor to, for each mismatched state between the compared configuration data, generate, via the display, on the second pane of the development workspace, one or more eighth graphical elements (e.g., a checkbox) at a location proximal to the sixth graphical elements, each of the one or more eighth graphical elements comprising a widget (e.g., a checkbox) for a selection of the configuration data associated with the hardware configuration to be modified with configuration data associated with the corresponding software configuration.

In some embodiments, the instructions, when executed by the processor, cause the processor to, in response to a selection of a widget associated with a given eighth graphical element of the one or more eighth graphical elements, update the configuration data of the software configuration with the retrieved hardware configuration.

In some embodiments, the instructions, when executed by the processor, cause the processor to, in response to the GUI input coinciding with a given generated seventh graphical element, retrieve configuration data (e.g., category name, identification, module name, slot number, sub category name, and submodule number for the in-software configuration) for the software configuration and configuration data for the hardware configuration for the given input-output hardware device; and generate a ninth graphical element as a dynamic overlay of the first and second configuration data, the overlay being disposed at the determined pointer location over the given generated seventh graphical element.

In some embodiments, the one or more seventh graphical elements include a first set of symbols associated with a mismatched state between the hardware configuration and the software configuration for each input-output module of the input-output hardware device.

In some embodiments, the one or more seventh graphical elements include a second set of symbols associated with a matched state between the hardware configuration and the software configuration for the input-output hardware device.

In some embodiments, each of the one or more seventh graphical elements comprises a first color value and a second color value, wherein the first color value is presented when all parameters of the hardware configuration and software configuration for a given input-output module of the input-output hardware device have a matched state, and wherein the second color value is presented when any parameters of the hardware configuration and software configuration for the given input-output module of the input-output hardware device has a mismatched state.

In some embodiments, the instructions, when executed by the processor, cause the processor to, upon the selection, in the first pane, of a graphical element associated with the given controller hardware device, determine an identifier and one or more network parameters associated with the input-output hardware devices associated with the selected controller hardware device; generate on the second pane of the development workspace, a widget having a presentation of the determined identifier and the determined one or more network parameters, wherein the widget is rendered proximal to the respective second graphical element associated with the determined input-output hardware device; receive via the presented widget, one or more modified values for the one or more network parameters; and, for each modified values received via the presented widget, cause the modified values of the one or more network parameters to be updated to the determined input-output hardware device.

In some embodiments, the one or more network parameters for the determined input-output hardware device are updated automatically and without further user input.

In some embodiments, the instructions, when executed by the processor, cause the processor to receive input from a graphical user interface; determine a location of a pointer based on the GUI input and generate a visual representation of the pointer on the display; in response to the location of the pointer coinciding with the visual representation of a third graphical element of an input-output module presented in the second pane, retrieve configuration information of the respective input-output module; and generate an eleventh graphical element as a dynamic overlay, the overlay being disposed at the determined pointer location over the third graphical element.

In some embodiments, the instructions, when executed by the processor, cause the processor to, for each submodule coupled to the input-output module, present, via the eleventh graphical element, a selectable pane to display configuration data associated with a given submodule.

In some embodiments, the configuration information includes a first data having a slot value associated with a slot location of the input-output submodule within the input-output hardware devices, a second data having a description value associated with the input-output hardware device, and a third data having a category value associated with the input-output hardware device.

BRIEF DESCRIPTION OF THE DRAWINGS

The components in the drawings are not necessarily to scale relative to each other and like reference numerals designate corresponding parts throughout the several views:

FIG. 4 is a diagram illustrating a comparative widget of FIG. 3, in accordance with an illustrative embodiment.

FIG. 5 is a diagram illustrating an identification pane of FIG. 1, in accordance with an illustrative embodiment.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
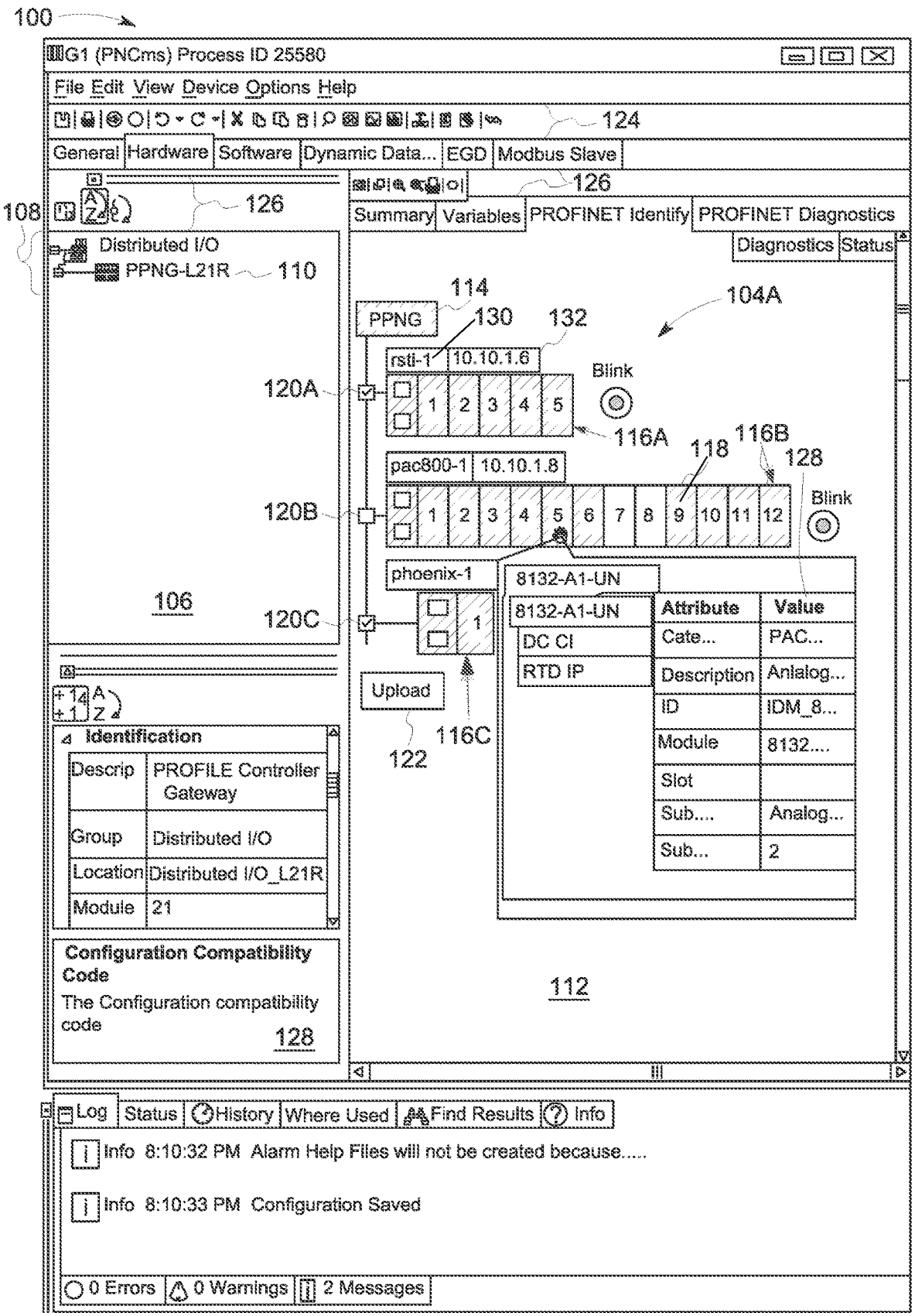
FIG. 1 is a diagram illustrating a development workspace for configuring hardware devices in an industrial automation system, in accordance with an illustrative embodiment.

FIG. 1 is a diagram illustrating a development workspace 100 for configuring hardware devices in an industrial automation system in accordance with an illustrative embodiment. Among other things, the development workspace 100 maintains a software configuration profile for devices in the industrial automation system for the development of control applications for the system using the devices. The development workspace 100 includes a navigation pane 106 that presents a plurality of graphical elements 108 comprising a list (e.g., a tree of distributed IO devices) of one or more controller hardware devices 110, collectively, forming the industrial automation system. The list of controller hardware devices 110 are associated with a project for running the industrial application and for the configuring and setting up of device configurations of the controller hardware devices 110 in such application. The development workspace 100 is configured to receive device-retrieved configuration data (also referred to as "hardware configuration data") retrieved from devices within the industrial automation system and to use the device-retrieved configuration data to populate and/or update the software configuration profile (of the devices) as maintained in the development workspace 100.

In some embodiments, the industrial automation system includes programmable logic controllers (PLCs), supervisory control and data acquisition (SCADA) systems, and programmable automation controllers (PACs), safety instrumented systems (SISs), and the like, (collectively forming a distributed I/O system) for controlling power generation systems and/or machinery in an industrial automation application. One of more of the PLC, SCADA, and PAC controllers are configurable to receive input-output modules, as well as submodules, that provides input and output channels to controllable elements (e.g., sensors and actuators) in the system. The PLC, SCADA, and PAC controllers, and network directing elements (e.g., switches and routers) connected thereto, are configured to provide, over a communication link, to components (e.g., the development workspace) in the network, hardware description data and device configuration data associated with the controllers. In some embodiments, the communication link is provided over industrial protocols, such as Profinet, Profibus, InterCAD, FieldBus, and the like.

In an aspect, the development workspace provides a single intuitive configuration workspace to present configuration details of control components within an industrial automation system. This configuration workspace enables a holistic view of identified hardware configuration and the modular reconciliation and troubleshoot of the network device and module configurations.

As shown in FIG. 1, the development workspace 100 includes a configuration pane 112 that provides a visual representation (shown as 104a) of the connectivity and configuration of the controller (shown as widget 114) and connected input-output hardware 116 (shown as widgets 116a, 116b, and 116c) of the industrial automation system. The visual representation 104a of the controller (corresponding to widget 114) and input-output hardware (corresponding to widget 116) further includes graphical elements 118 representing sub-components, such as input-output modules (and submodules thereof) connected to each respective input-output hardware. Upon selection, in the first pane 106, of a graphical element 110 associated with a given controller hardware device, the development workspace 100 determines the associated input-output hardware devices and respective modules/submodules thereof, to generate the visual representation 104a of the selected controller device (corresponding to widget 110) and the determined input-output hardware devices (corresponding to widgets 114, 116, 118). To aid the operator of the development workspace to identify components of the input-output hardware devices, the visual representation 104a of the input-output hardware devices (corresponding to widget 116) includes different visual schemes for positions (e.g., slots) in the input-output hardware devices that have connected modules. That is, a first visual scheme is presented for a connected module at each given slot of the input-output hardware devices, and a second visual scheme is presented for an empty slot (i.e., an available slot) in the input-output hardware devices. As shown in FIG. 1, controller (corresponding to widget 116a) includes five connectable slots to which five input-output modules are operatively connected; controller (corresponding to widget 116b) includes twelve connectable slots to which ten input-output modules (in slots 1-6 and 9-12) are operatively connected; and controller (corresponding to widget 116c) includes four connectable slots to which four input-output modules are operative connected. In some embodiments, a third visual scheme (not shown) is presented for a connected module with a connected sub-module.

In another aspect, the development workspace enables the discovery of device configuration and device description (e.g., directly from the respective hardware device) and the presentation and harmonization of such information with existing configuration in the development workspace with minimal operator interaction, thereby reducing the complexity and time in setting up devices in the industrial automation system, as well as, remove the need to troubleshoot for mismatched configuration data between the development workspace and the local data of the respective device.

As shown in FIG. 1, the configuration pane 112 includes a plurality of selectable widgets 120 (shown as 120a, 120b, and 120c), each associated with a connected input-output hardware device 116. The configuration pane 112 further includes a widget 122 (also referred to as a prompt) (shown as "Upload 122") to initiate the interrogation and upload of data from selected input-output hardware device (based on selection of widgets 120) to the development workspace. In response to the selection of the widget 122, the development workspace 100 causes the system thereof to retrieve hardware configuration of the input-output hardware devices associated with the selected selectable widgets and update the rendered visual representations of the presented controller, the presented input-output hardware devices, and the presented input-output modules (and/or submodules). An example interrogation and upload process is later discussed (in relation to FIG. 6).

In some embodiments, the widget 122 is presented when a new project for the development workspace 100 is created, thereby aiding the operator in configuring the software configuration of the development workspace with the hardware configuration of each respective devices. To this end, the operator does not have to manually provide configuration data of the respective hardware into the project nor does the operator have to troubleshoot the entry if there is a mismatched in the entered data and the retrieved hardware configuration data. In some embodiments, upon the selection of the widget 120, the "upload" widget 122 is then presented for initialization by the operator.

As shown in the figure, the selectable widgets 120, to select input-output hardware device for configuration data upload and discovery, are presented in the visual representation 104a as a checkbox. It should be appreciated that other mechanisms to present and receive input from the selectable widgets 120 may be used without departing from the spirit of the disclosure. In some embodiments, the selectable widgets 120 are presented in the visual representation 104a as an icon or any widgets (e.g., circles, ovals) to designate selection of the input-output hardware device for configuration data upload and discovery. Each selectable widget 120 is preferably presented proximal to, or in connection with, an associated input-output hardware device to which it has an association. In other embodiments, the selection of the input-output hardware device 116 causes the visual representation of the input-output hardware device 116 to change (e.g., as a highlight). In yet another embodiments, a graphical element (e.g., a star, a check-mark, a dot, a check-mark, a text overlay) is inserted proximal to the input-output hardware device 116 as an indication of its selection for its interrogation and configuration data upload.

In addition, as shown in the figure, the upload widget 122 to initiate the interrogation and upload of data from selected input-output hardware is presented as a button located proximal to the visual representation 104a. It should be appreciated that widget 122 is one example of triggering the process of interrogating and uploading from the hardware to the development workspace. Other implementations of the widget 122 may be used without departing from the spirit of the disclosure. In some embodiments, the widget 122 is presented in the development workspace as a menu button in the menu 124. In other embodiments, the widget 122 is presented a menu 126 of the first or second pane 106, 112.

Figure 2:
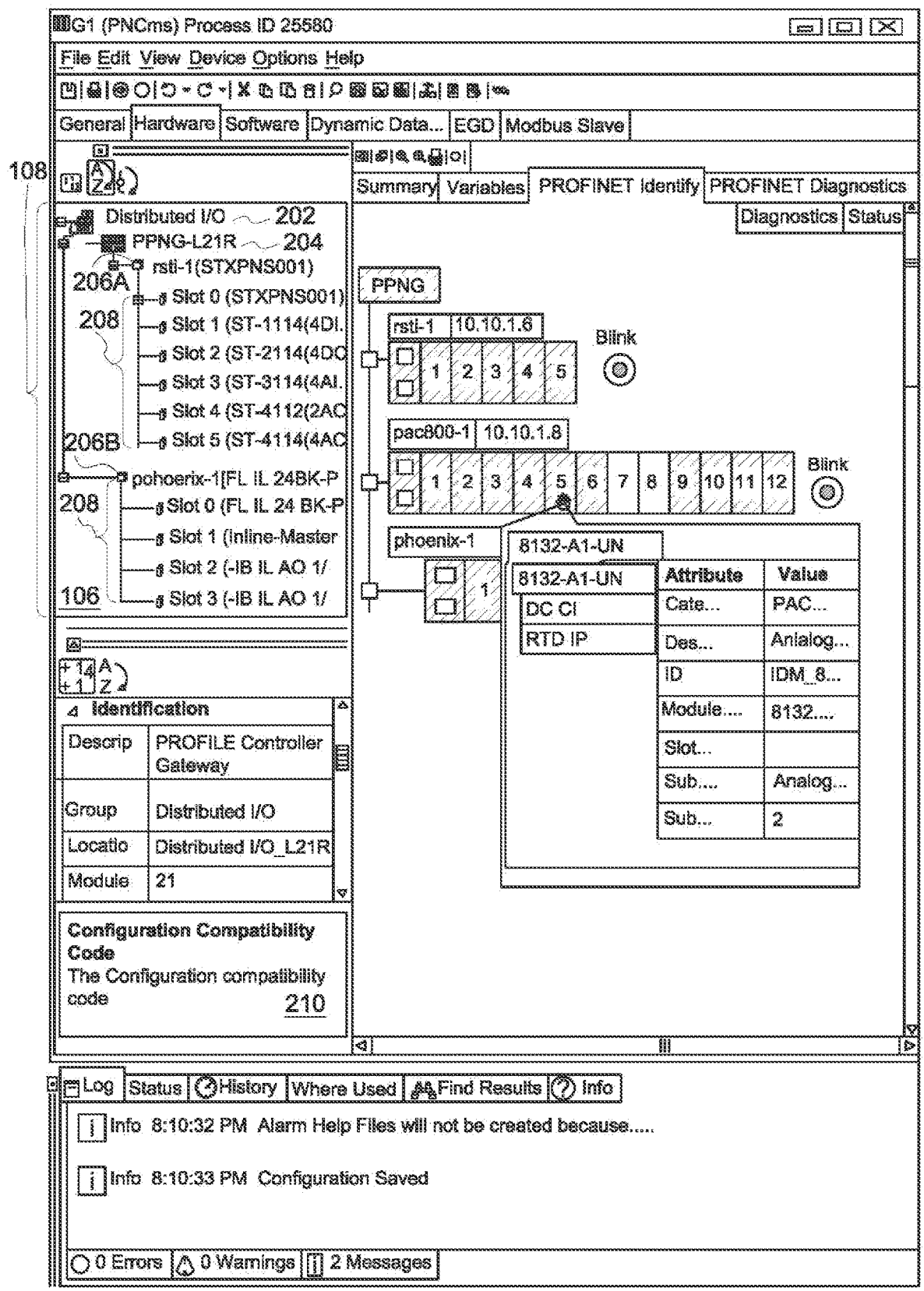
FIG. 2 is a diagram illustrating presentation of device-retrieved configuration data (retrieved from devices within an industrial automation system) within the development workspace of FIG. 1 following initiation of the device-data discovery process, in accordance with an illustrative embodiment.

FIG. 2 is a diagram illustrating the presentation of device discovered configuration data in the development workspace of FIG. 1 following initiation of discovery of hardware configuration from the devices within an industrial automation system, in accordance with an illustrative embodiment. As shown, the graphical elements 108 presented in the navigation pane 106 is updated to include the input-output module names for each available slots of the presented input-output hardware devices. In the example shown in FIG. 2, the network for the "Distributed I/O" (shown as widget 202) includes a controller "PPNG-L2IR" (shown via widget 204), which includes three input-output hardware devices (shown as "RSTI-1" 206a, "phoenix-1" 206b, which corresponds to an IO device, model no. STXPNS001, and a second IO device comprising a programmable automation controller, model no. FL IL 24 BK-PA). In this example, because the widgets 120 (as shown in FIG. 1) corresponding to hardware device (shown as widgets 116a and 116c) are selected (and not the device corresponding to widget 116b), only the configuration data and device description data for the selected devices (namely those corresponding to widges 116a, 116c) are shown in pane 106 in FIG. 2.

Upon upload of the configuration data, each of the graphical elements associated with the discovered input-output modules of a given input-output hardware device may be presented to include a slot location identifier, a module name, and a module description. For example, as shown in FIG. 2, the "rsti" input-output hardware device is presented in pane 106 to include: at slot 0, a STXPNS001 module (a Profinet network interface module, part no. STXPNS001); at slot 1, a ST-1114 module (module with 4 points of discrete inputs with positive logic at $5V_{DC}$, part no. ST-1114); at slot 2, a ST-2114 module (module with 4 points of TTL digital outputs with $5V_{DC}$/20 mA inverting capabilities, part no. ST-2114); at slot 3, a ST-3114 module (module with 4 channels of analog inputs, each with 0-20 mA range over 12 bits, part no. ST-3114); at slot 4, a ST-4112 module (module with 2 channels of analog outputs, each with 0-20 mA range over 12 bits, part no. ST-4112); and at slot 5, a ST-4114 module (module with 4 channels of analog outputs, each with 0-20 mA range over 12 bits, part no. ST-4114). As further shown in FIG. 2, the "phoenix-1" input-output hardware device is presented, via the pane 106, to be a programmable automation controller with Ethernet/inline bus coupler, part no. FL IL 24 BK-PAC and include: at slot 0, a FL IL 24 BK-PAC controller; at slot 1, an inline bus coupler; at slot 2, a IB IL AO 1/SF-PAC module (which is an analog input/output module with 1 output, 2-wire termination, 24 $V_{DC}$, 0-20 mA, 4-20 mA, 0-10 V); and at slot 3, a second IB IL AO 1/SF-PAC module.

In another aspect, following discovery of hardware description and device configuration of the connected devices, the development workspace enables the adoption of the discovered hardware description and device configuration to the software configuration associated with the development workspace. Upon selection of an input-output hardware device from the presented list thereof in the navigation pane 106, the development workspace includes a pane to review differences between the retrieved configuration and device data from the devices and the configuration data for the primary purpose of converting retrieved configuration and description data from the device to the software configuration.

Figure 3:
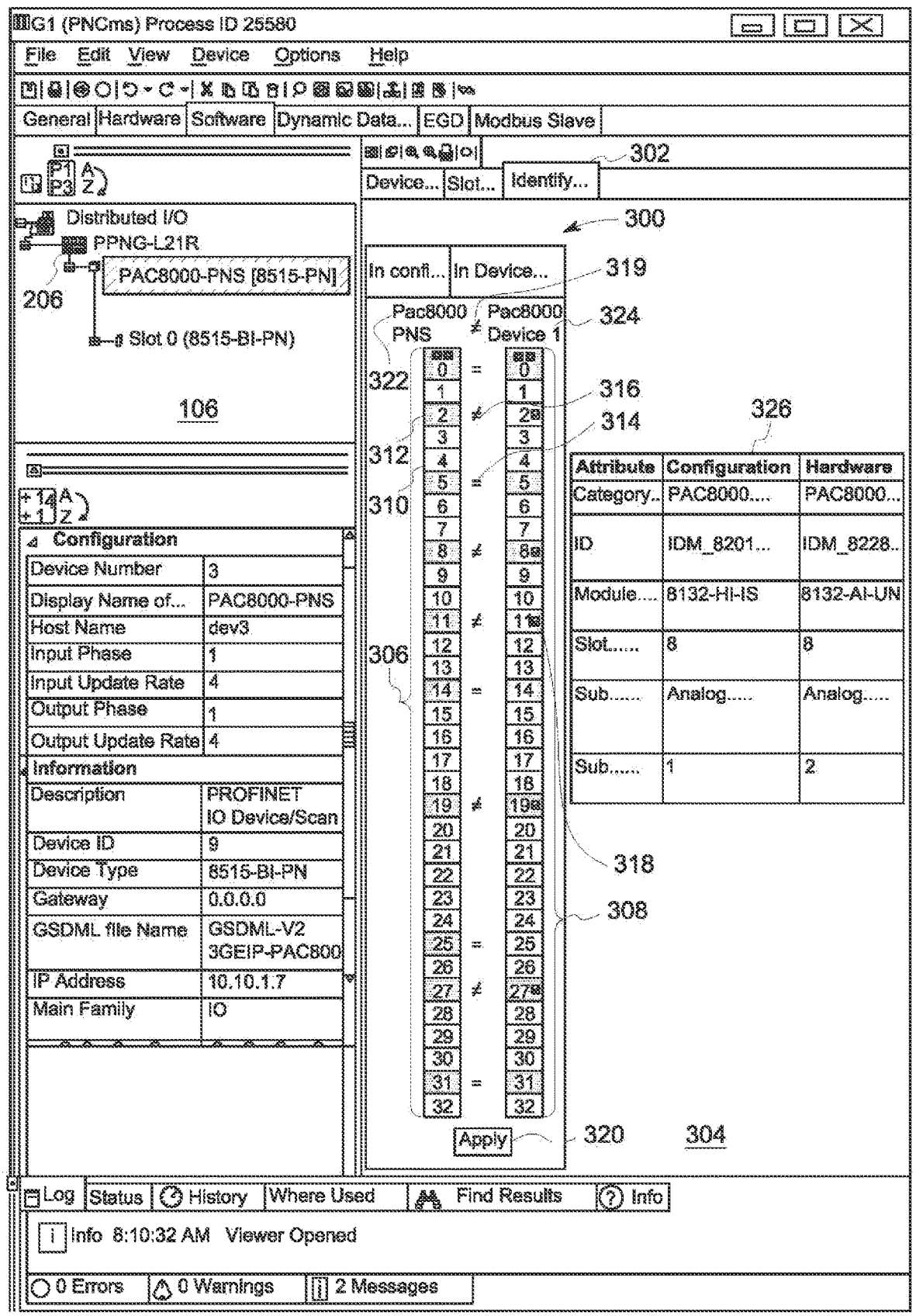
FIG. 3 is a diagram illustrating a comparative view of device-retrieved configuration data retrieved from devices in an industrial automation system and software configuration of the device maintained within the development workspace, in accordance with an illustrative embodiment.

FIG. 3 is a diagram illustrating a comparative view 300 of device-retrieved configuration data retrieved from devices in an industrial automation system and software configuration of the device maintained within the development workspace, in accordance with an illustrative embodiment. The development workspace 100 may present the comparative view 300 upon selection of a device harmonization tab 302 (shown as "identify device" 302) following selection of the device 206 in the navigation pane 106.

The comparative view may be presented as a table that illustrates configuration settings for the software and configuration settings from the hardware. The table view may indicate positions that are empty and positions that includes a connected input-output module. The table view may further indicate, via an identifying symbol, matching and mismatching configuration states between the software and the hardware settings. The table view further includes an input (e.g., a widget, icon, etc.) to enable the configuration data associated with the hardware to be adopted and/or converted to the configuration settings associated with the development workspace. Because the action requires only the selection of the respective hardware configuration at each given slot position, the development workspace makes the porting of the hardware configuration to the software configuration a one-step process for the operator. In some embodiments, upon presentation of the table view, all the retrieved configuration settings are pre-selected for conversion to the software configuration to which the operator can de-select configuration settings not desired to the converted. The table view, in some embodiments, provides the operator with select all and de-select all features.

It should be appreciated that the comparison data representation may be that of other structures rather than a table. Examples of such structures includes a grid view or a tree view.

Referring now to FIG. 3, the development workspace 100 includes a table view 300 in comparison pane 304; the comparison pane 304 includes graphical elements associated with each slot in a selected input-output hardware device (corresponding to widget 206). The graphical elements includes both elements 306 associated with the software configuration settings and elements 308 associated with the hardware configuration settings. As discussed, the software configuration settings are associated with operator-provided settings for configuring and/or updating configuration of the input-output hardware device; and the hardware configuration settings are associated with retrieved-device data retrieved from the input-output hardware device (that is, the present hardware description and configuration data presently maintained at the memory of the device).

Still referring to FIG. 3, the comparison pane 304 illustrates each slot (for the software and hardware configuration elements 306, 308) that has a connected input-output module via a first representation (shown as 310) and an empty slot via a second representation (shown as 312). As shown, the software and hardware configuration do not necessarily match. Slots in the hardware configuration may be filled or empty depending on the connected input-output modules and the corresponding slots in the software configuration may configured according to the operator's input. The comparison pane 304 presents graphical elements 314, 316 (shown as an "equal" sign and an "unequal" sign) to illustrate matching and mismatching configuration states between the software and hardware configuration data (that is, all fields associated with a given module and submodule thereof for the hardware configuration are the same (or not the same) as all fields in the software configuration). The graphical elements 314, 316 may have different visual schemes (e.g., color) to highlight the similarity or differences in the configuration. The development workspace further renders the comparison pane 304 with a comparison symbol 320 between graphical elements 322, 324 corresponding to the overall software configuration and the overall hardware configuration. The list of hardware and software configuration data used for the comparison, in some embodiments, is editable via operator preference window.

It should be appreciated that other visual representation of the matching and mismatching configuration data may be used. For example, in some embodiments, representations of non-matching configuration symbols may be animated. In addition, beside equal and non-equal signs, other type of symbols may be used—for example, a dot, a triangle, a line, a box, text, among others. These symbols may be presented proximal to the slot of interest to signal to the operator of matching or mismatching configuration data between the visual representations of the two columns within the comparison pane.

As discussed, the table view further includes an input (e.g., a widget, menu icon) to enable the adoption and/or conversion of configuration data associated with the hardware with the software configuration settings associated with the development workspace. As shown in FIG. 3, the development workspace 100 generates an operator selectable widget 318 for each mismatched configuration-data state between the hardware and software configuration for a given slot. The widget 318, in some embodiments, are pre-selected (that is, having an initial state of being selected). The development workspace 100 further generates a second widget 320 (here, shown as an "Apply" button 320) to initiate the conversion of the selected hardware configuration data for a given mismatched slot to the software configuration data.

Referring still to FIG. 3, the development workspace 100 generates device and module level data in a comparative widget 326 (e.g., a dialog window) to present information between the hardware and the software configuration. That is, in some embodiments, upon the mouse movement, a detail window pops up to display differences between the software module and the hardware module. Example device and module level data may include, but are not limited to, category name, module name, IO name, number of slots, sub-category name, and number of connected submodules.

FIG. 4 is a diagram illustrating a comparative widget of FIG. 3, in accordance with an illustrative embodiment. As shown in FIG. 4, the development workspace 100 presents the comparative widget 326 as three columns: the first column 402 displaying attributes fields, the second column 404 displaying the field data for the existing software configuration, and the third column 406 displaying the field data for the local hardware configuration data. The development workspace 100 further compares the data between the software configuration and the hardware configuration and renders each respective matching (e.g., shown as 408) and mismatching attribute (e.g., shown as 410) with highlighting representations (e.g., by color or fonts). As shown, the attributes includes category name field 412, module name field 414, IO name field 416, number of slots field 418, sub-category name field 420, and a number of connected submodules field 422.

In some embodiments, the development workspace generates the comparative widget 326 as a floating object when the user prompt (via the graphical user interface, e.g., mouse prompt) is placed over either graphical elements 314, 316 (corresponding to the rendered matching and mismatching symbols for each respective input-output module slot position).

In some embodiments, the data presented in the comparative widget 326 are live values that are retrieved from a given input-output hardware device when the rendering of the widget 326 is requested. In other embodiments, the data presented is cached within the development workspace and is updated when the system is triggered to do so by an operator.

The comparison pane 304 operates with the discovery feature of the development workspace 100 to enable the user to selectively retrieve configuration and device data of certain input-output hardware device selected from a list of available connected device, to then readily review differences between the retrieved configuration and device data from the devices and the configuration data within the development workspace, and to then selectively convert and/or import the retrieved data to software configuration profile for the input-output hardware device and the input-output modules and submodules.

The development workspace, in some embodiments, includes a filtering field to provide searching. In some embodiments, the searching may be based on categories of differences, e.g., different identifier number, module name, slot number, sub-category name, submodules, etc.

Referring back to FIG. 1, to provide for the identification of the configuration of the distributed IO system, the development workspace 100 includes an identification pane (shown as 128). The identification pane 128 (also referred to as an inspector window) may include a description information field, a group information field, a location information field, a field for the number of total modules aggregated from all the connected input-output hardware devices, a field for an update rate for the devices, network configuration information field, a device name field, a serial number field, and a field for the hardware and software revision number.

FIG. 5 is a diagram illustrating an identification pane 128 of FIG. 1, in accordance with an illustrative embodiment. As shown in FIG. 5, the development workspace 100 presents the identification pane 128 as a two column table in which the first column 502 displays attributes fields and the second column 504 displays fields associated with the field data for the local hardware configuration data. As shown, the attributes includes category name 506, description information 508, module identification number 510, module name 512, slot number 514, sub-category name 516, and number of submodules 518.

Still referring to FIG. 5, when applicable, the development workspace 100 generates the identification pane 128 with sub-modules sub-tabs 520 for the presentation of identification panes for each submodules associated with the input-output modules. Submodules are attachable components that are optionally mounted to an input-output module. For example, an input-output module may include input channels for temperature readings. Certain class of devices may include a number of submodules that connects to the module for a specific sensor type (e.g., 4-wire RTD, 3-wire RTD, etc.). As shown, the "8132-AI-UN" input-output module 520 (that is, an analog input module with 8-channel isolated analog input, each input configurable to receive 4-20 mA, thermocouple, resistance temperature detector (RTD) inputs, and voltage inputs) includes two submodules (shown as "DC CI" 522 and "RTD IP" 524).

To this end, the development workspace with the various visual representations of the configuration pane of FIG. 1 and the comparative views of FIG. 3 provide a holistic view of identified hardware configuration and enables the modular reconciliation of the network device and modules configuration, provides information for trouble shooting, and an eloquent view to modify device configurations.

In another aspect, to further reduce the complexity of configuring of network configurations of the controllers and input-output hardware devices of the industrial automation system, the development workspace includes an interactive display within the configuration workspace that allows user to modify network parameters such as network name and network address of each connected input-output hardware device within the network.

As shown in FIG. 1, the development workspace 100 renders graphical widgets 130, 132 for the network name and network address for each connected input-output hardware devices. In some embodiments, the development workspace 100 retrieves the information from the respective device to present it to the operators via widgets 130, 132.

The development workspace 100 is configured to receive an input via the widgets 130, 132. Upon completion of the input (e.g., via an <Enter> stroke), the development workspace 100 is configured to transmit the network name and network address to the respective input-output hardware device without further inputs from the operator.

In addition, in some embodiments, the development workspace includes a widget to trigger a software-presented signaling sequence of light-emitting diodes (LEDs) in the development workspace that corresponds to signaling sequences of control devices in the industrial automation network. This signaling sequence may be used to identify and distinguish a given control device from other control devices in the network. As shown in FIG. 1, the development workspace 100 includes, in second pane 112, a widget 134 (shown as "blink 134") to trigger the presentation of a signaling sequence via widget 136 (shown as LEDs 136a and 136b) associated with individual input-output hardware device. The signaling sequence include varying frequency and duration of "blinks" that is specific to the device.

Process to Upload Hardware Description Data and Configuration Data

As discussed above, the configuration pane 112 of FIG. 1 includes a widget 122 (shown as "Upload 122") to initiate the interrogation and upload of data from selected input-output hardware device to the development workspace. In response to the selection of the widget 122, the development workspace causes the system to retrieve hardware configuration of the input-output hardware devices associated with the selected selectable widgets and update the rendered visual representations of the presented controller, the presented input-output hardware devices, and the presented input-output modules (and/or submodules).

Figure 6:
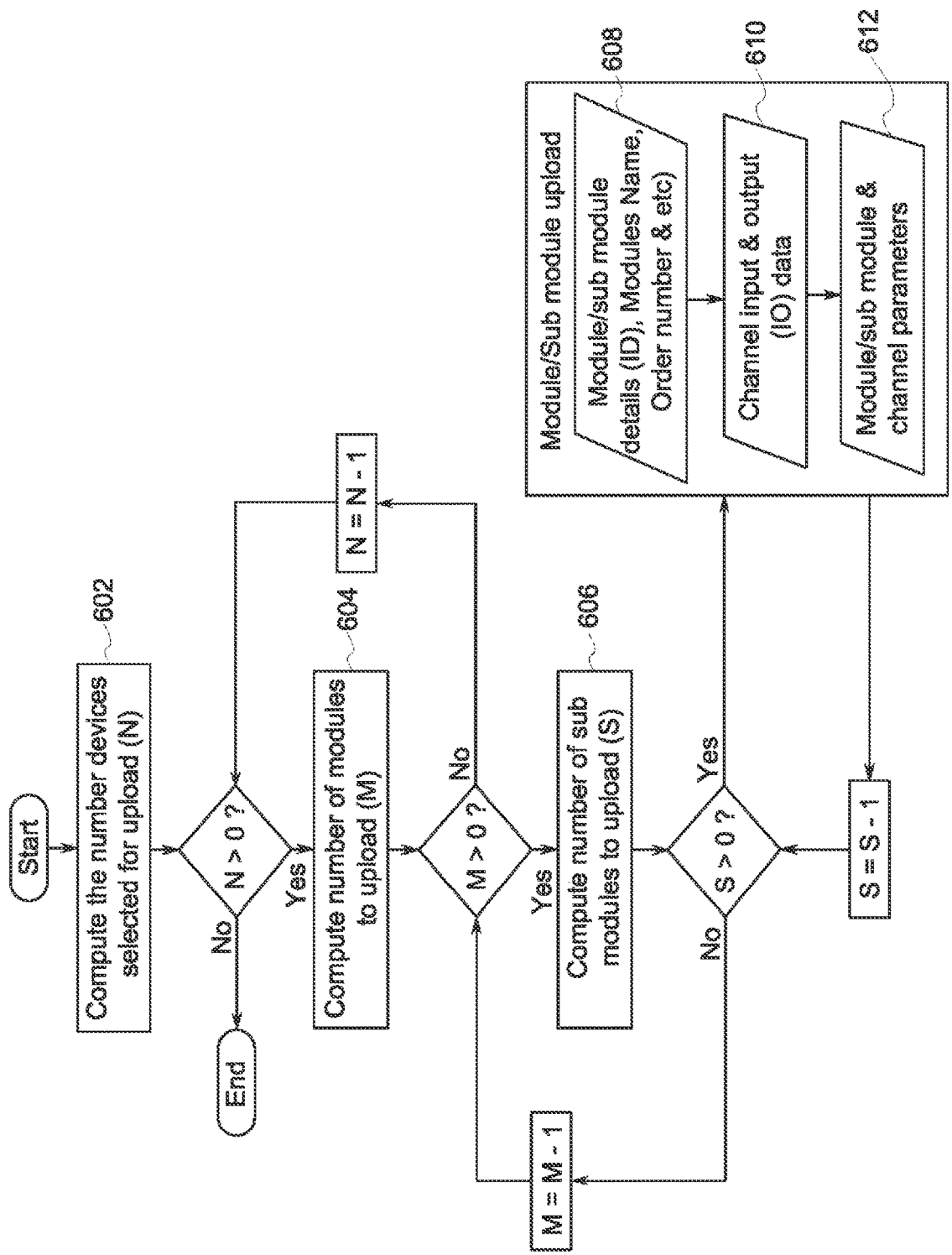
FIG. 6 is a flowchart illustrating a process of uploading device-retrieved configuration data retrieved from the devices to the software configuration profile maintained by the development workspace, in accordance with an illustrative embodiment.

FIG. 6 is a flowchart illustrating a process 600 of uploading device-retrieved configurations data (retrieved from devices within the industrial automation system) to the software configuration profile maintained by the development workspace, in accordance with an illustrative embodiment. As shown in FIG. 6, the system determines the number of devices selected for the upload (referred to a number N) (block 602), the number of modules for each selected device (block 604), and the number of submodules for each module of the selected device (block 606). For each module and each submodule, the system interrogates the input-output device (and receives data from the device) for i) the module and/or submodule details (e.g., module/submodule identification number, module/submodule name, module/submodule order number, and the like) (block 608), ii) the channel input and output data (block 610), and iii) the module/submodule channel parameters (block 612).

Processes for Configuration Hardware Devices

Figure 7:
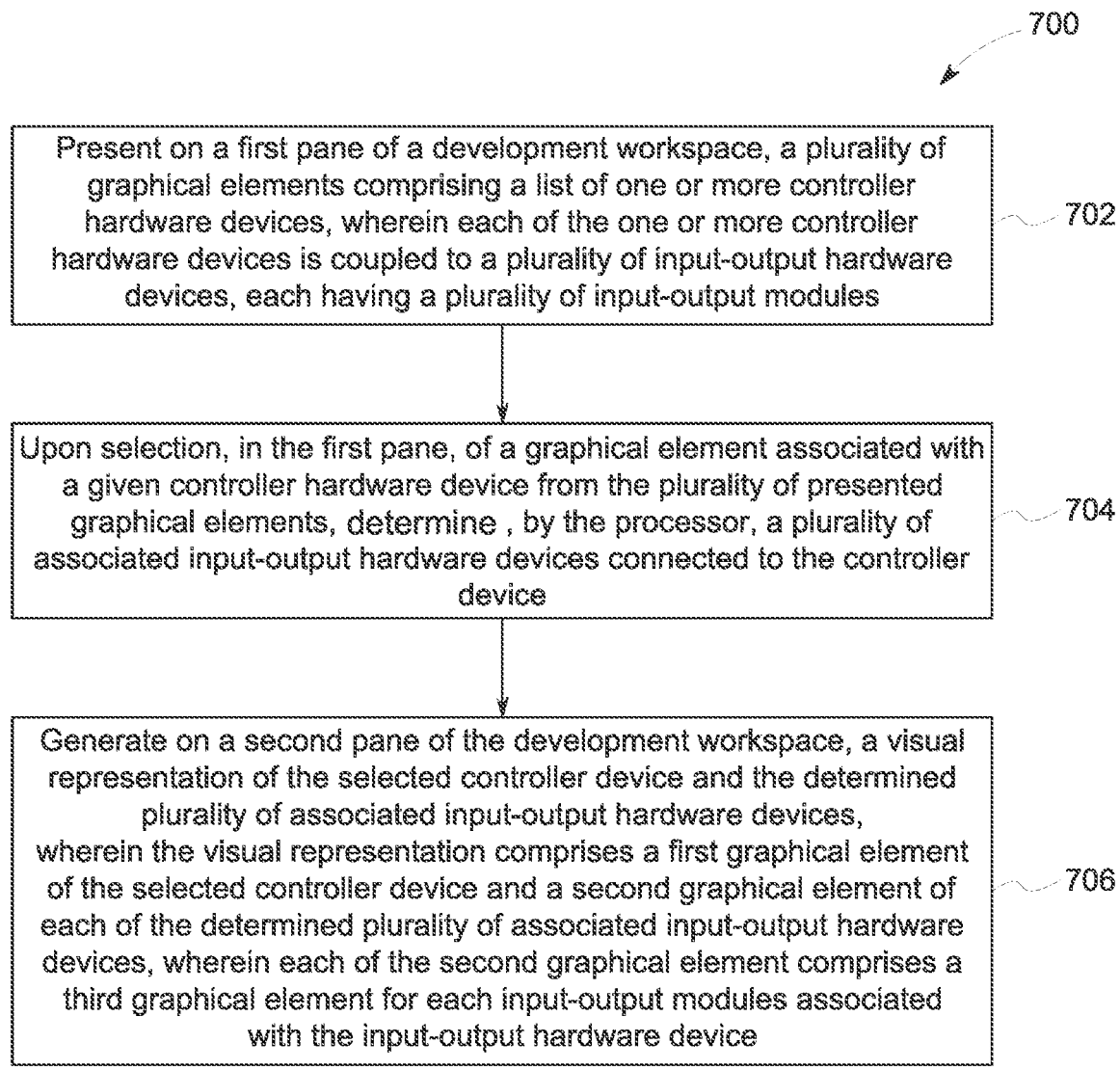
FIG. 7 is a flowchart illustrating a process of presenting hardware device configuration data of devices in an industrial automation system, the presentation being for the configuring of the devices for the control application, in accordance with an illustrative embodiment.

FIG. 7 is a flowchart illustrating a process 700 of presenting hardware devices configuration data for devices in an industrial automation system, the presentation being for the configuring of the configuration data of the devices for the control application, in accordance with an illustrative embodiment. The process 700 includes presenting, by a processor, via a display, on a first pane (e.g., the navigation pane 106) of a development workspace 100, a plurality of graphical elements 108 comprising a list (e.g., a tree of distributed IO devices) of one or more controller hardware devices, where each of the one or more controller hardware devices is coupled to a plurality of input-output hardware devices, and where each has a plurality of input-output modules (step 702).

The process 700 further includes, upon selection, in the first pane 106, of a graphical element associated with a given controller hardware device from the plurality of presented graphical elements (e.g., controller 110), determining, by the processor, a plurality of associated input-output hardware devices connected to the controller device (step 704).

The process 700 further includes generating, by the processor, via the display, on a second pane (e.g., the configuration pane 112) of the development workspace 100, a visual representation 104a of the selected controller device and the determined plurality of associated input-output hardware devices, where the visual representation includes a first graphical element (e.g., 114) of the selected controller device and a second graphical element (e.g., 116a, 116b, 116c) of each of the determined plurality of associated input-output hardware devices, wherein each of the second graphical element comprises a third graphical element (e.g., 118) for each input-output module associated with the input-output hardware device. The first, second, and third graphical elements 112, 116, and 118 may be rendered connected to each another corresponding to the network connectivity of the connected hardware devices.

Figure 8:
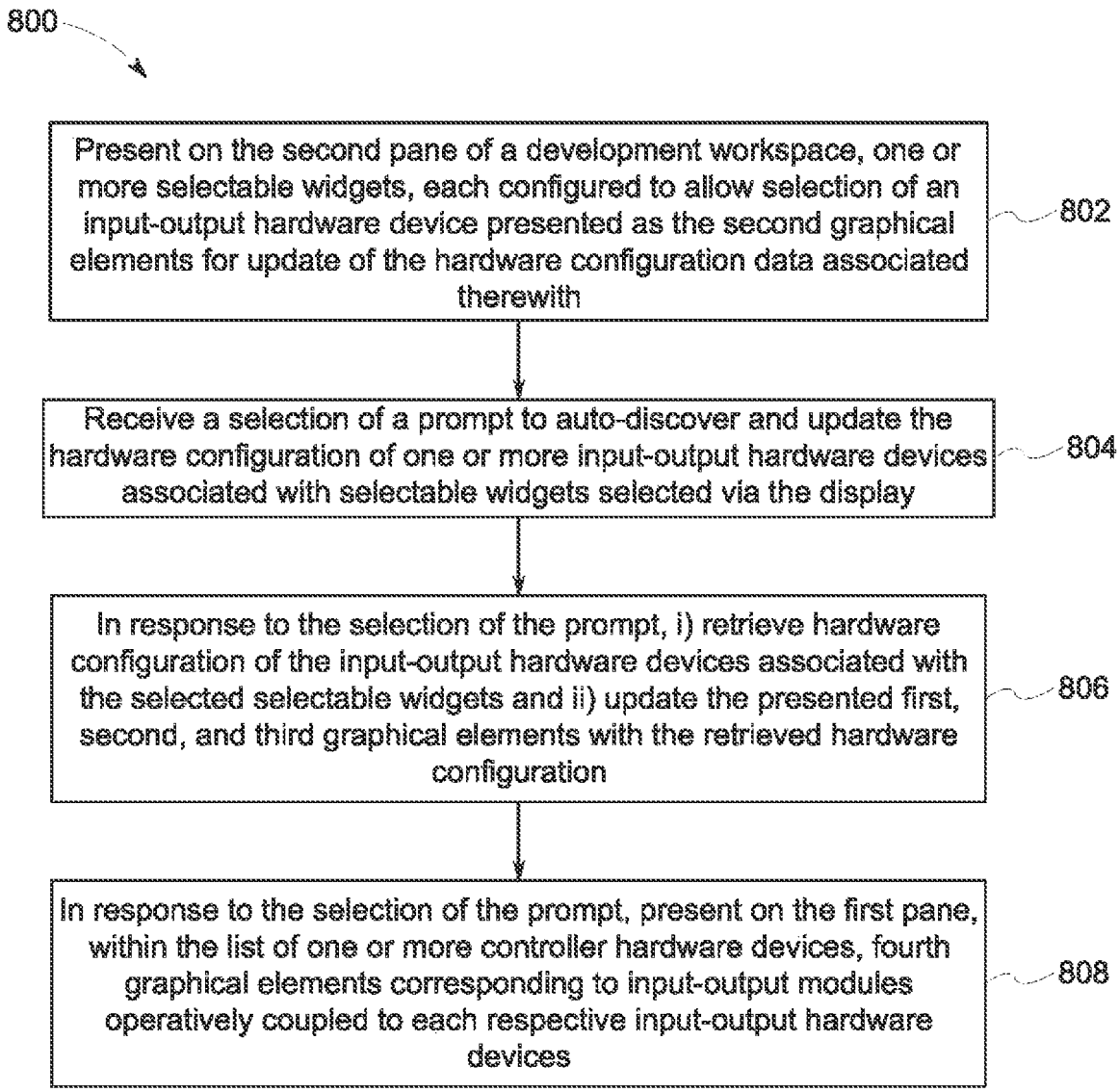
FIG. 8 is a flowchart illustrating the uploading process (of FIG. 6) of device-retrieved configuration data, in accordance with another illustrative embodiment.

FIG. 8 is a flowchart illustrating the uploading process 800 (of FIG. 6) of device-retrieved configuration data to the software configuration profile maintained by the development workspace, in accordance with another illustrative embodiment.

The process 800 includes, presenting, by the processor, via the display, on the second pane (e.g., the configuration pane 112) of a development workspace 100, one or more selectable widgets (e.g., 120a, 120b, 120c), each configured to allow selection of an input-output hardware device presented as the second graphical elements (e.g., 116a, 116b, 116c) (step 802). Each selectable widget 120 may be presented proximal to the respective second graphical elements 116 for update of the hardware configuration data associated therewith.

The processor 800, in some embodiments, further includes, receiving, by the processor, a selection of a prompt to auto-discover (e.g., via widget 122) and update the hardware configuration of one or more input-output hardware devices (e.g., represented as 116a, 116b, and 116c) associated with selectable widgets 120 selected via the display (step 804).

The process 800, in some embodiments, further includes, in response to the selection of the prompt (e.g., the widget 122), i) retrieving hardware configuration of the input-output hardware devices associated with the selected selectable widgets 120 and ii) updating the presented first, second, and third graphical elements 114, 116, 118 with the retrieved hardware configuration (step 806).

The process 800, in some embodiments, further includes, in response to the selection of the prompt (e.g., the widget 122), presenting, via the display, on the first pane (e.g., pane 106), within the list of one or more controller hardware devices, fourth graphical elements (e.g., modules 208) corresponding to input-output modules operatively coupled to each respective input-output hardware devices (step 808).

The processor 800, in some embodiments, further includes presenting, by the processor, via the display, on the development workspace 100, one or more widget (e.g., 120) to present a visual representation (e.g., of software configuration of a selected input-output hardware device.

Figure 9:
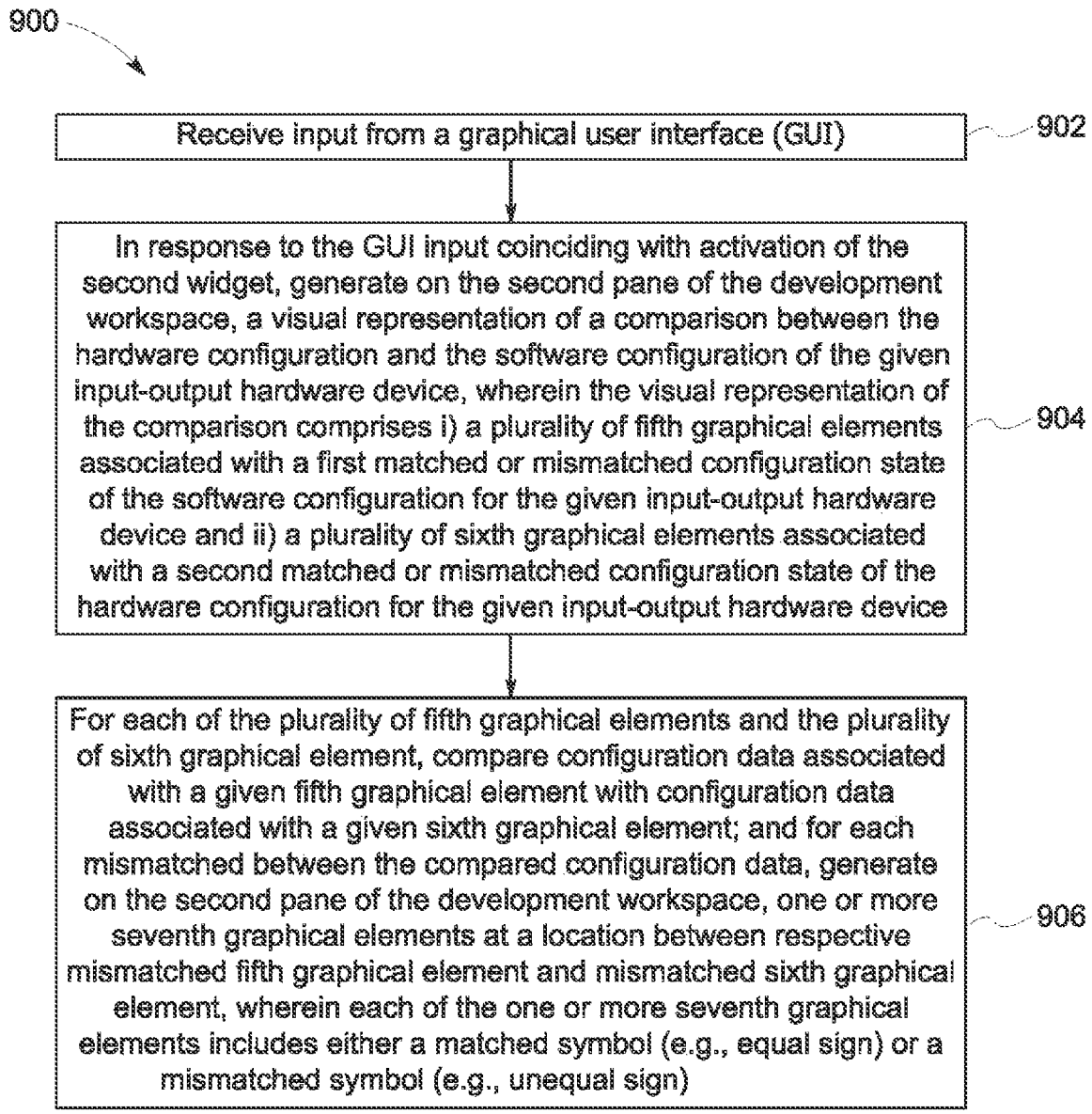
FIG. 9 is a flowchart illustrating the process of generating the comparative view of FIG. 3, in accordance with an illustrative embodiment.

FIG. 9 is a flowchart illustrating the process 900 of generating the comparative view of FIG. 3, in accordance with an illustrative embodiment. As shown in FIG. 3, the development workspace 100 includes a second widget 302 to enable a workspace 304 for converting, on-the-fly, data for the software configuration of the development workspace from auto-discovered device configuration. The process 900 includes receiving, by the processor, input from a graphical user interface (e.g., a mouse input) (step 902).

The process 900 further includes, in response to the input coinciding with activation of the second widget 302, generating, by the processor, via the display, on the second pane 304 of the development workspace 100, a visual representation 300 of a comparison between the hardware configuration and the software configuration of the given input-output hardware device (step 904), wherein the visual representation of the comparison includes i) a plurality of fifth graphical elements 306 associated with a first matched or mismatched configuration state of the software configuration for the given input-output hardware device and ii) a plurality of sixth graphical elements 308 associated with a second matched or mismatched configuration state of the hardware configuration for the given input-output hardware device.

The processor 900, in some embodiments, further includes, for each of the plurality of fifth graphical elements 306 and the plurality of sixth graphical element 308, comparing configuration data associated with a given fifth graphical element 306 with configuration data associated with a given sixth graphical element 308; and for each mismatched between the compared configuration data, generating, by the processor, via the display, on the second pane 304 of the development workspace 100, one or more seventh graphical elements 316 at a location between respective mismatched fifth graphical element and mismatched sixth graphical element (step 906), wherein each of the one or more seventh graphical elements includes either a matched symbol 314 (e.g., equal sign) or a mismatched symbol 316 (e.g., unequal sign).

Figure 10:
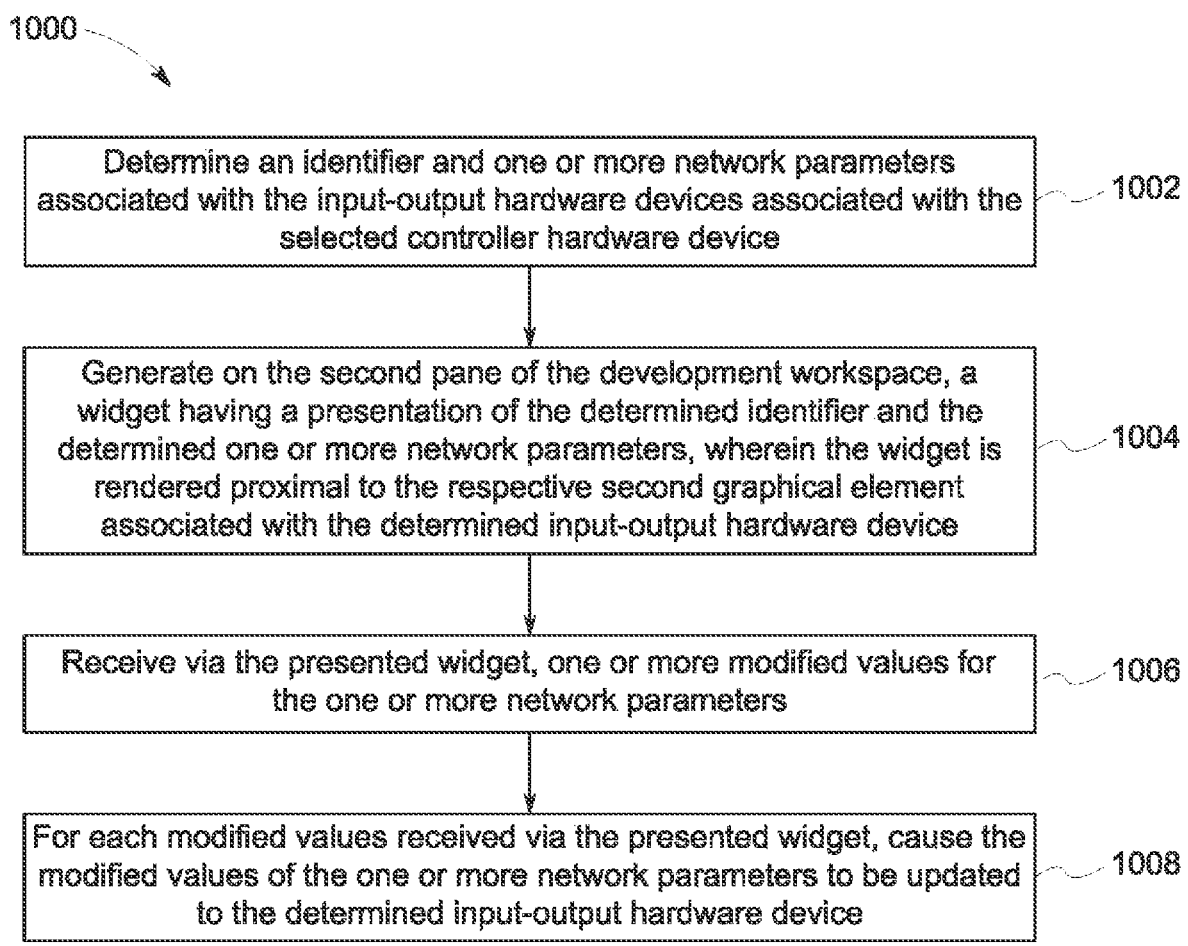
FIG. 10 is a flowchart illustrating the process of generating an interactive display to change the network parameters of a connected controller in an industrial automation system, in accordance with an illustrative embodiment.

FIG. 10 is a flowchart illustrating the process 1000 of generating an interactive display to change the network parameters of a connected controller in an industrial automation system, in accordance with an illustrative embodiment. The process 1000 includes determining, by the processor, an identifier and one or more network parameters associated with the input-output hardware devices associated with the selected controller hardware device (step 1002).

The process 1000, in some embodiments, further includes generating, by the processor, on the second pane 112 of the development workspace 1000, a widget (e.g., 130, 132) having a presentation of the determined identifier and the determined one or more network parameters, wherein the widget is rendered proximal to the respective second graphical element associated with the determined input-output hardware device (step 1004).

The process 1000, in some embodiments, further includes receiving, by the processor, via the presented widget (e.g., 130, 132), one or more modified values for the one or more network parameters (step 1006).

The process 1000, in some embodiments, further includes, for each modified values received via the presented widget, causing, by the processor, the modified values of the one or more network parameters to be updated to the determined input-output hardware device (step 1008).

Figure 11:
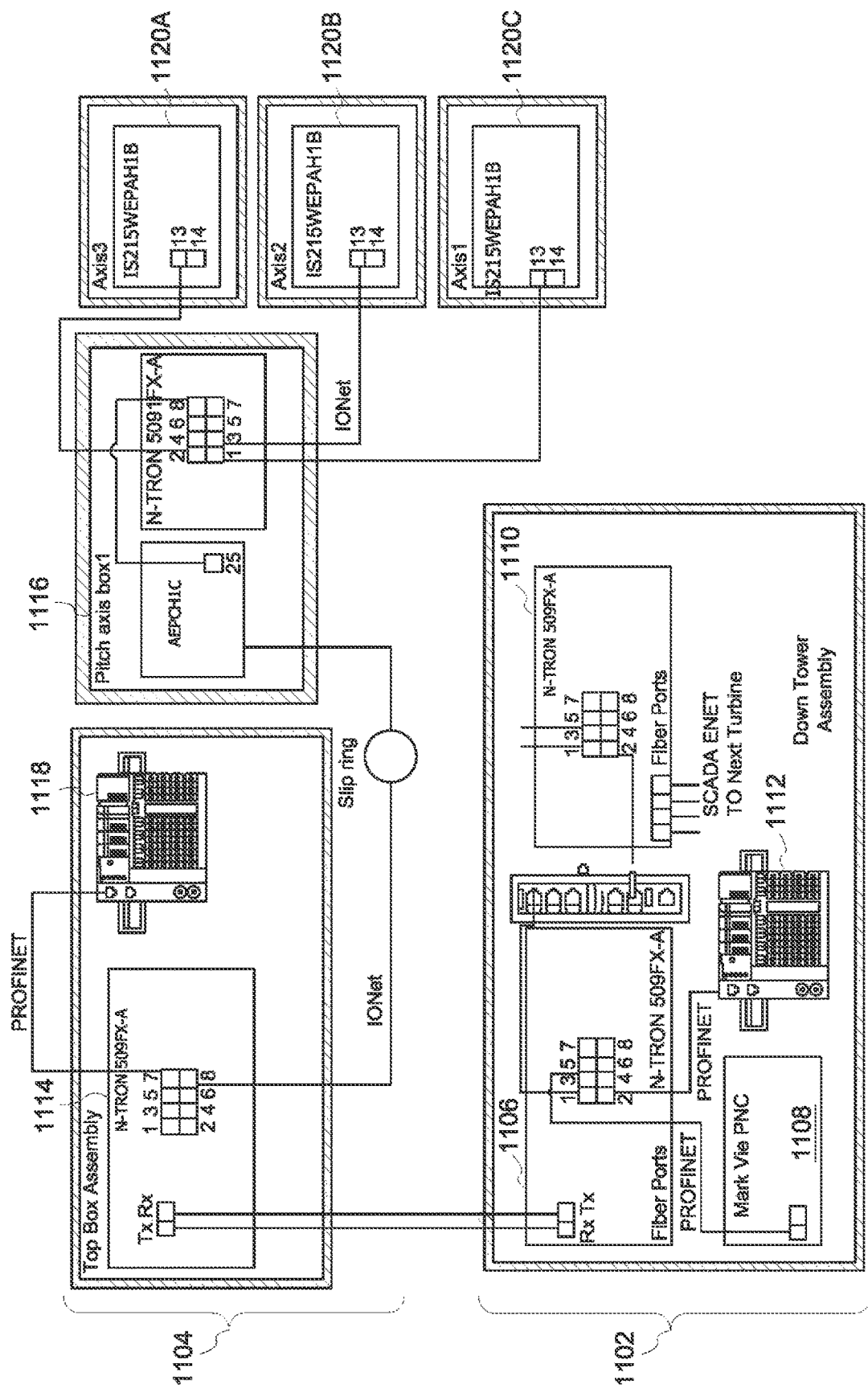
FIG. 11 is a diagram of an example industrial automation system, in accordance with an illustrative embodiment.
Figure 12:
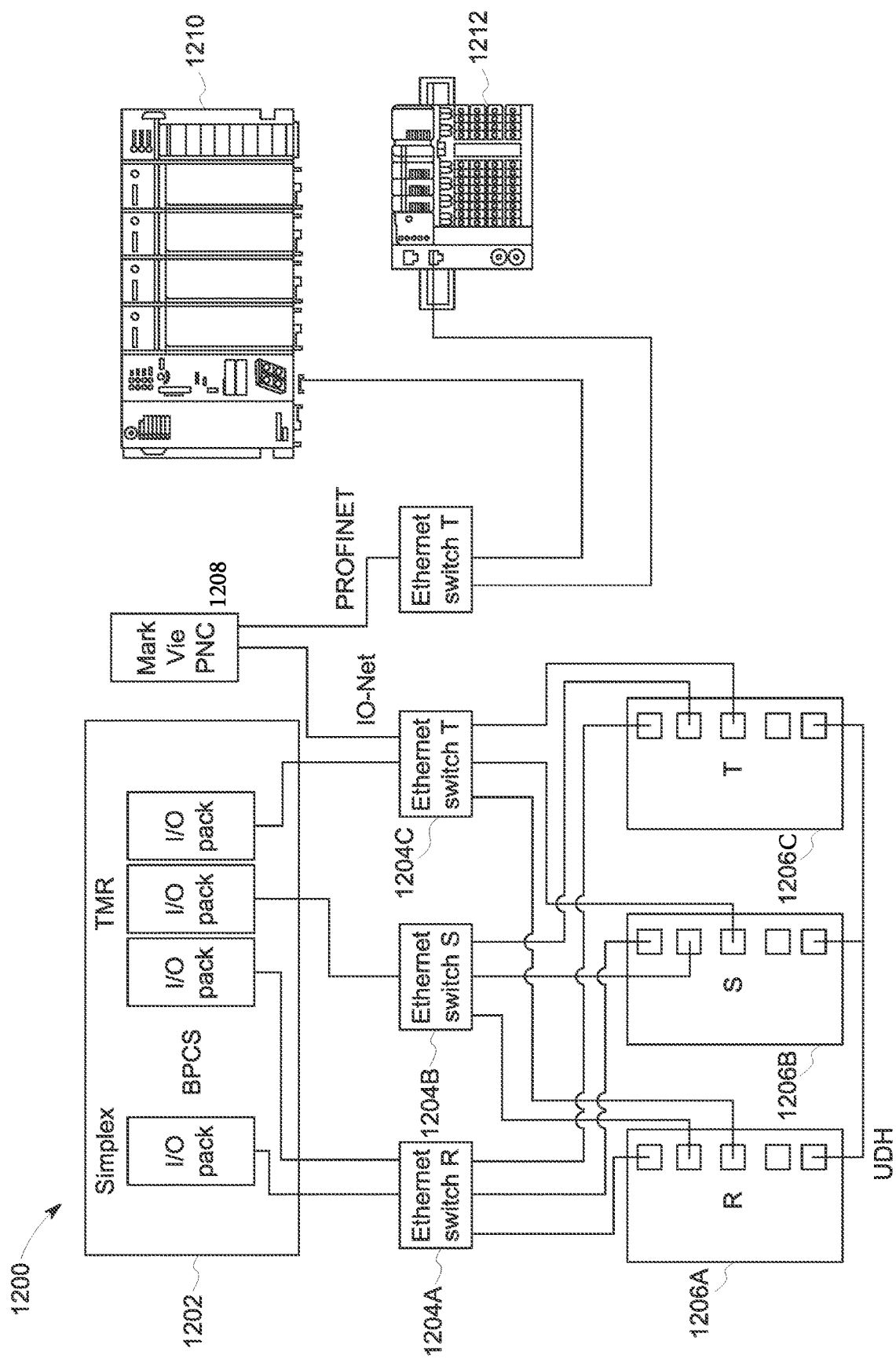
FIG. 12 is a diagram of another example industrial automation system, in accordance with an illustrative embodiment.

FIGS. 11 and 12 are diagrams of example industrial automation systems, in accordance with an illustrative embodiment. As shown in FIG. 11, the industrial automation system 1100 comprises an example control system for a wind turbine generator and includes a first local network 1102 located at the base of the wind turbine connected to a second local network 1104 located at the turbine cab. The first local network 1102 includes a network device 1106 having a communication link (e.g., via Profinet, Profibus, InterCAD) and communicates with a controller 1108 (shown as "Mark VIe 1108"), a SCADA system 1110 to connect to other wine turbine generators, and a controller 1112 to monitoring conditions at the base of the tower. The second local network 1104 includes a second network device 1114 having a communication link (e.g., via Profinet, Profibus, InterCAD) and communicates with controllers 1116 for each pitch axis (e.g., that regulates control of the pitch, yaw, and rotation of one of the multiple blades of the turbine), and controller 1118 for monitor conditions at the nacelle of the tower. The controllers 1116 connect to controllers 1120a, 1120b, 1120c for each of the blade rotatable axis.

As shown in FIG. 12, the industrial automation system 1200 comprises an example control system for a power plant and include a Mark VIe controller 1202 for core engine controls. To provide redundancy, the controller 1202 interfaces to sets of network devices (shown as Ethernet switches 1204a, 1204b, and 1204c) that connects to a set of controllers 1206a, 1206b, 1206c. The controller 1202 further connects to a Mark Vie PNC controller 1208 which couples to auxiliary controllers 1210, 1212 in the power plant.

Each of the controllers 1106, 1108, 1110, 1118, 1116, 1120, 1202, 1206, 1210, 1212 may include, individually, tens to hundreds of connected modules and submodules.

Figure 13:
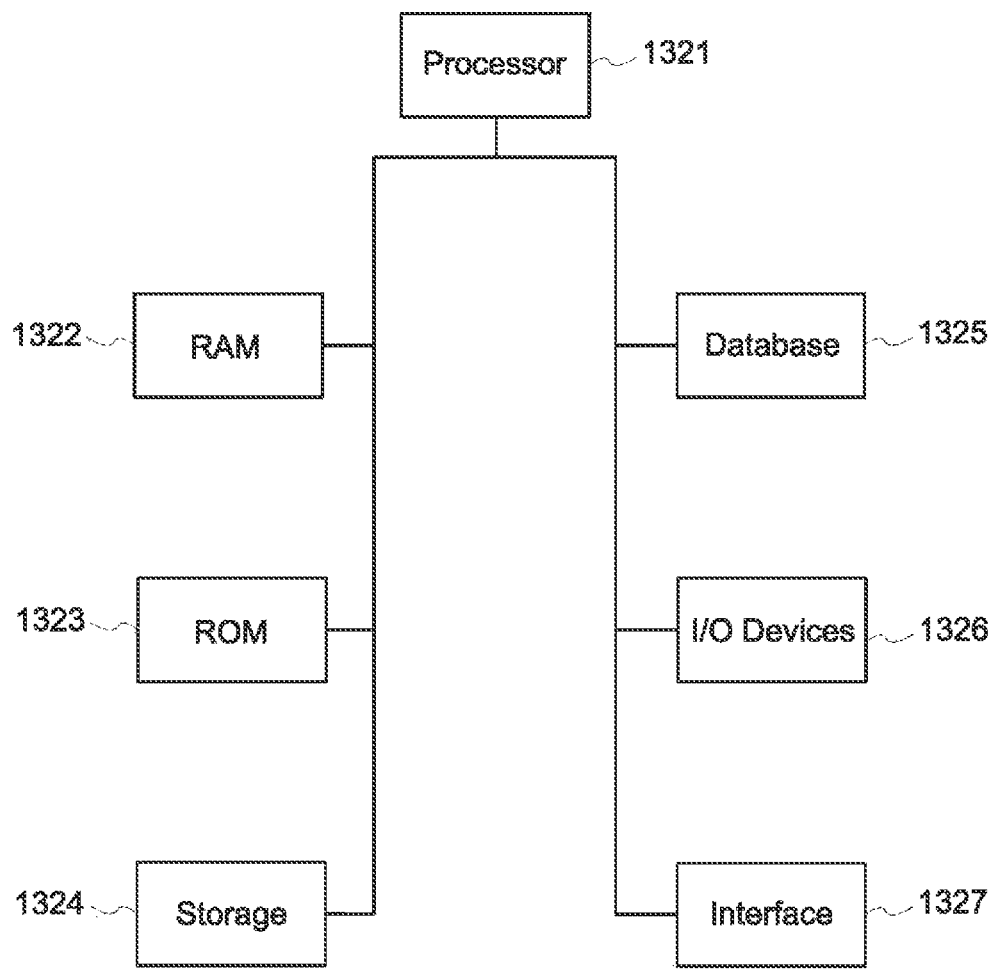
FIG. 13 illustrates an exemplary computer that can be used for configuring hardware devices in an industrial automation system.

FIG. 13 illustrates an exemplary computer that can be used for configuring hardware devices in an industrial automation system. In various aspects, the computer of FIG. 13 may comprise all or a portion of the development workspace 100, as described herein. As used herein, "computer" may include a plurality of computers. The computers may include one or more hardware components such as, for example, a processor 1321, a random access memory (RAM) module 1322, a read-only memory (ROM) module 1323, a storage 1324, a database 1325, one or more input/output (I/O) devices 1326, and an interface 1327. Alternatively and/or additionally, controller 1320 may include one or more software components such as, for example, a computer-readable medium including computer executable instructions for performing a method associated with the exemplary embodiments. It is contemplated that one or more of the hardware components listed above may be implemented using software. For example, storage 1324 may include a software partition associated with one or more other hardware components. It is understood that the components listed above are exemplary only and not intended to be limiting.

Processor 1321 may include one or more processors, each configured to execute instructions and process data to perform one or more functions associated with a computer for indexing images. Processor 1321 may be communicatively coupled to RAM 1322, ROM 1323, storage 1324, database 1325, I/O devices 1326, and interface 1327. Processor 1321 may be configured to execute sequences of computer program instructions to perform various processes. The computer program instructions may be loaded into RAM 1322 for execution by processor 1321. As used herein, processor refers to a physical hardware device that executes encoded instructions for performing functions on inputs and creating outputs.

RAM 1322 and ROM 1323 may each include one or more devices for storing information associated with operation of processor 1321. For example, ROM 1323 may include a memory device configured to access and store information associated with controller 1320, including information for identifying, initializing, and monitoring the operation of one or more components and subsystems. RAM 1322 may include a memory device for storing data associated with one or more operations of processor 1321. For example, ROM 1323 may load instructions into RAM 1322 for execution by processor 1321.

Storage 1324 may include any type of mass storage device configured to store information that processor 1321 may need to perform processes consistent with the disclosed embodiments. For example, storage 1324 may include one or more magnetic and/or optical disk devices, such as hard drives, CD-ROMs, DVD-ROMs, or any other type of mass media device.

Database 1325 may include one or more software and/or hardware components that cooperate to store, organize, sort, filter, and/or arrange data used by controller 1320 and/or processor 1321. For example, database 1325 may store hardware and/or software configuration data associated with input-output hardware devices and controllers, as described herein. It is contemplated that database 1325 may store additional and/or different information than that listed above.

I/O devices 1326 may include one or more components configured to communicate information with a user associated with controller 1320. For example, I/O devices may include a console with an integrated keyboard and mouse to allow a user to maintain a database of images, update associations, and access digital content. I/O devices 1326 may also include a display including a graphical user interface (GUI) for outputting information on a monitor. I/O devices 1326 may also include peripheral devices such as, for example, a printer for printing information associated with controller 1320, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1327 may include one or more components configured to transmit and receive data via a communication network, such as the Internet, a local area network, a workstation peer-to-peer network, a direct link network, a wireless network, or any other suitable communication platform. For example, interface 1327 may include one or more modulators, demodulators, multiplexers, demultiplexers, network communication devices, wireless devices, antennas, modems, and any other type of device configured to enable data communication via a communication network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain. It will be apparent to those skilled in the art that various modifications and variations

What is claimed is:

1. A method for configuring hardware devices in an industrial automation system, the method comprising:

presenting, by a processor, via a display, on a first pane of a development workspace, a plurality of graphical elements comprising a list of one or more controller hardware devices, wherein each of the one or more controller hardware devices is coupled to a plurality of input-output hardware devices, each having a plurality of input-output modules;

upon selection, in the first pane, of a graphical element associated with a given controller hardware device from the plurality of presented graphical elements, determining, by the processor, a plurality of associated input-output hardware devices connected to the controller device; and generating, by the processor, via the display, on a second pane of the development workspace, a visual representation of the selected controller device and the determined plurality of associated input-output hardware devices, wherein the visual representation comprises a first graphical element of the selected controller device and a second graphical element of each of the determined plurality of associated input-output hardware devices, wherein each of the second graphical element comprises a third graphical element for each input-output module associated with the input-output hardware device, wherein the development workspace comprises a second widget to enable a workspace for converting, on-the-fly, software configuration of the development workspace from auto-discovered device configuration, the method further comprising:

receiving, by the processor, input from a graphical user interface (GUI);

in response to the GUI input coinciding with activation of the second widget, generating, by the processor, via the display, on the second pane of the development workspace, a visual representation of a comparison between the hardware configuration and the software configuration of the given input-output hardware device, wherein the visual representation of the comparison comprises:

i) a plurality of fifth graphical elements associated with a first matched or mismatched configuration state of the software configuration for the given input-output hardware device, and ii) a plurality of sixth graphical elements associated with a second matched or mismatched configuration state of the hardware configuration for the given input-output hardware device.

2. The method of claim 1, wherein each of the plurality of fifth graphical elements and the plurality of sixth graphical elements includes an empty configuration state for each input-output module location in the given input-output hardware device not having a connected input-output module.

3. The method of claim 1, comprising:

for each of the plurality of fifth graphical elements and the plurality of sixth graphical element, comparing configuration data associated with a given fifth graphical element with configuration data associated with a given sixth graphical element;

for each mismatched state between the compared configuration data, generating, by the processor, via the display, on the second pane of the development workspace, one or more seventh graphical elements at a location between respective mismatched fifth graphical element and mismatched sixth graphical element, wherein each of the one or more seventh graphical elements includes either a matched symbol or a mismatched symbol.

4. The method of claim 3, comprising:

for each mismatched state between the compared configuration data, generating, by the processor, via the display, on the second pane of the development workspace, one or more eighth graphical elements at a location proximal to the sixth graphical elements, each of the one or more eighth graphical elements comprising a widget for a selection of the configuration data associated with the hardware configuration to replace the configuration data associated with the corresponding software configuration.

5. The method of claim 4, comprising, in response to a selection of a widget associated with an eighth graphical element of the one or more eighth graphical elements, updating, by the processor, the configuration data of the software configuration with the retrieved hardware configuration.

6. The method of claim 3, comprising:

in response to the GUI input coinciding with a given generated seventh graphical element, retrieving, by the processor, configuration data for the software configuration and the configuration data for the hardware configuration for the given input-output hardware device; and generating, by the processor, a ninth graphical element as a dynamic overlay of the first and second configuration data, the overlay being disposed at the determined pointer location proximal to the given generated seventh graphical element.

7. The method of claim 3, wherein the one or more seventh graphical elements include a first set of symbols associated with a mismatched between the hardware configuration and the software configuration for each input-output module of the input-output hardware device.

8. The method of claim 7, comprising:

wherein the one or more seventh graphical elements include a second set of symbols associated with a matched state between the hardware configuration and the software configuration for the input-output hardware device.

9. The method of claim 8, comprising:

wherein each of the one or more seventh graphical elements comprises a first color value and a second color value, wherein the first color value is presented when all parameters of the hardware configuration and software configuration for a given input-output module of the input-output hardware device have a matched state, and wherein the second color value is presented when any parameters of the hardware configuration and software configuration for the given input-output module of the input-output hardware device has a mismatched state.

10. A non-transitory, computer-readable medium storing instructions that, when executed by a processor, cause the processor to:

present, via a display, on a first pane of a development workspace, a plurality of graphical elements comprising a list of one or more controller hardware devices, wherein each of the one or more controller hardware devices is coupled to a plurality of input-output hardware devices, each having a plurality of input-output modules;

upon selection, in the first pane, of a graphical element associated with a given controller hardware device from the plurality of presented graphical elements, determine a plurality of associated input-output hardware devices connected to the controller device; and generate, via the display, on a second pane of the development workspace, a visual representation of the selected controller device and the determined plurality of associated input-output hardware devices, wherein the visual representation comprises a first graphical element of the selected controller device and a second graphical element of each of the determined plurality of associated input-output hardware devices, wherein each of the second graphical element comprises a third graphical element for each input-output module associated with the input-output hardware device, wherein the development workspace comprises a second widget to enable a workspace for converting, on-the-fly, software configuration of the development workspace from auto-discovered device configuration, and wherein the instructions further cause the processor to:

receive input from a graphical user interface (GUI);

in response to the GUI input coinciding with activation of the second widget, generate, via the display, on the second pane of the development workspace, a visual representation of a comparison between the hardware configuration and the software configuration of the given input-output hardware device, wherein the visual representation of the comparison comprises:

i) a plurality of fifth graphical elements associated with a first matched or mismatched configuration state of the software configuration for the given input-output hardware device, and ii) a plurality of sixth graphical elements associated with a second matched or mismatched configuration state of the hardware configuration for the given input-output hardware device.

11. The non-transitory, computer-readable medium of claim 10, wherein each of the plurality of fifth graphical elements and the plurality of sixth graphical elements includes an empty configuration state for each input-output module location in the given input-output hardware device not having a connected input-output module.

12. The non-transitory, computer-readable medium of claim 10, wherein the instructions further cause the processor to:

for each of the plurality of fifth graphical elements and the plurality of sixth graphical element, compare configuration data associated with a given fifth graphical element with configuration data associated with a given sixth graphical element;

for each mismatched state between the compared configuration data, generate, via the display, on the second pane of the development workspace, one or more seventh graphical elements at a location between respective mismatched fifth graphical element and mismatched sixth graphical element, wherein each of the one or more seventh graphical elements includes either a matched symbol or a mismatched symbol.

13. The non-transitory, computer-readable medium of claim 12, wherein the instructions further cause the processor to:

for each mismatched state between the compared configuration data, generate, via the display, on the second pane of the development workspace, one or more eighth graphical elements at a location proximal to the sixth graphical elements, each of the one or more eighth graphical elements comprising a widget for a selection of the configuration data associated with the hardware configuration to replace the configuration data associated with the corresponding software configuration, wherein the instructions further cause the processor to, in response to a selection of a widget associated with an eighth graphical element of the one or more eighth graphical elements, update the configuration data of the software configuration with the retrieved hardware configuration.

14. The non-transitory, computer-readable medium of claim 12, wherein the instructions further cause the processor to:

in response to the GUI input coinciding with a given generated seventh graphical element, retrieve configuration data for the software configuration and the configuration data for the hardware configuration for the given input-output hardware device; and generate a ninth graphical element as a dynamic overlay of the first and second configuration data, the overlay being disposed at the determined pointer location proximal to the given generated seventh graphical element.

15. The non-transitory, computer-readable medium of claim 12, wherein the one or more seventh graphical elements include a first set of symbols associated with a mismatched between the hardware configuration and the software configuration for each input-output module of the input-output hardware device.

16. A system for configuring hardware devices in an industrial automation system, the system comprising:

one or more controller hardware devices;

a plurality of input-output hardware devices, each having a plurality of input-output modules;

a display; and a processor, the processor configured to:

present, via the display, on a first pane of a development workspace, a plurality of graphical elements comprising a list of the one or more controller hardware devices, wherein each of the one or more controller hardware devices is coupled to the plurality of input-output hardware devices;

upon selection, in the first pane, of a graphical element associated with a given controller hardware device from the plurality of presented graphical elements, determine a plurality of associated input-output hardware devices connected to the controller device; and generate, via the display, on a second pane of the development workspace, a visual representation of the selected controller device and the determined plurality of associated input-output hardware devices, wherein the visual representation comprises a first graphical element of the selected controller device and a second graphical element of each of the determined plurality of associated input-output hardware devices, wherein each of the second graphical element comprises a third graphical element for each input-output module associated with the input-output hardware device, wherein the development workspace comprises a second widget to enable a workspace for converting, on-the-fly, software configuration of the development workspace from auto-discovered device configuration, the processor further configured to:

receive input from a graphical user interface (GUI);

in response to the GUI input coinciding with activation of the second widget, generate, via the display, on the second pane of the development workspace, a visual representation of a comparison between the hardware configuration and the software configuration of the given input-output hardware device, wherein the visual representation of the comparison comprises:

i) a plurality of fifth graphical elements associated with a first matched or mismatched configuration state of the software configuration for the given input-output hardware device, and ii) a plurality of sixth graphical elements associated with a second matched or mismatched configuration state of the hardware configuration for the given input-output hardware device.

17. The system of claim 16, wherein the processor is further configured to:

for each of the plurality of fifth graphical elements and the plurality of sixth graphical element, compare configuration data associated with a given fifth graphical element with configuration data associated with a given sixth graphical element;

for each mismatched state between the compared configuration data, generate, via the display, on the second pane of the development workspace, one or more seventh graphical elements at a location between respective mismatched fifth graphical element and mismatched sixth graphical element, wherein each of the one or more seventh graphical elements includes either a matched symbol or a mismatched symbol.

18. The system of claim 17, wherein the processor is further configured to:

for each mismatched state between the compared configuration data, generate, via the display, on the second pane of the development workspace, one or more eighth graphical elements at a location proximal to the sixth graphical elements, each of the one or more eighth graphical elements comprising a widget for a selection of the configuration data associated with the hardware configuration to replace the configuration data associated with the corresponding software configuration.

19. The system of claim 17, wherein the processor is further configured to:

in response to the GUI input coinciding with a given generated seventh graphical element, retrieve configuration data for the software configuration and the configuration data for the hardware configuration for the given input-output hardware device; and generate a ninth graphical element as a dynamic overlay of the first and second configuration data, the overlay being disposed at the determined pointer location proximal to the given generated seventh graphical element.

20. The system of claim 17, wherein the one or more seventh graphical elements include a first set of symbols associated with a mismatched between the hardware configuration and the software configuration for each input-output module of the input-output hardware device.

* * * * *